US011260536B1

(12) United States Patent
Kim et al.

(10) Patent No.: US 11,260,536 B1
(45) Date of Patent: Mar. 1, 2022

(54) SIMULATION OF EMOTIONAL STATE OF AN INTERACTIVE DEVICE

(71) Applicant: AMAZON TECHNOLOGIES, INC., Seattle, WA (US)

(72) Inventors: Yelin Kim, Sunnyvale, CA (US); Amin Hani Atrash, Los Altos, CA (US); Raumi Nahid Sidki, San Jose, CA (US); Vikas Deshpande, Fremont, CA (US); Saurabh Gupta, Sunnyvale, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 304 days.

(21) Appl. No.: 16/552,278

(22) Filed: Aug. 27, 2019

(51) Int. Cl.
*G06F 17/00* (2019.01)
*B25J 11/00* (2006.01)

(52) U.S. Cl.
CPC .................. *B25J 11/001* (2013.01)

(58) Field of Classification Search
CPC ..................................... B25J 11/001
USPC ....................................... 700/250
See application file for complete search history.

(56) References Cited

U.S. PATENT DOCUMENTS

| 8,190,498 | B1* | 5/2012 | Bacco | G08B 13/19613 |
| | | | | 705/28 |
| 9,174,342 | B2* | 11/2015 | Pinter | G16H 40/67 |
| 9,370,862 | B2* | 6/2016 | Gupta | B25J 11/001 |
| 9,672,756 | B2* | 6/2017 | Gupta | A63H 30/04 |
| 9,829,333 | B1* | 11/2017 | Calder | G08G 1/166 |
| 9,974,612 | B2* | 5/2018 | Pinter | A61B 5/1128 |
| 10,192,195 | B1* | 1/2019 | Brazeau | G06Q 10/087 |
| 10,279,470 | B2* | 5/2019 | Gupta | B25J 13/06 |
| 10,919,151 | B1* | 2/2021 | Marchese | B25J 9/1612 |
| 10,958,895 | B1* | 3/2021 | Krishnan Gorumkonda ............... |
| | | | | H04N 13/257 |
| 2020/0156243 | A1* | 5/2020 | Ghare | G06F 11/3466 |

* cited by examiner

*Primary Examiner* — Ronnie M Mancho
(74) *Attorney, Agent, or Firm* — Lindauer Law, PLLC

(57) ABSTRACT

A simulated emotional state of a device is generated and maintained based on previous emotional state and contextual information. A trigger is associated with an effect value. For example, successful completion of a task may have an effect value of +5 while task failure may have an effect value of −6. Upon occurrence of a trigger, an associated effect value of the trigger may be combined with a previously determined effect value to determine a function input value (FIV). The FIV is used as input to a function that provides an emotion value as output. The emotion value may then be used as input to determine a particular action. For example, if the emotion value corresponds to "happy", the resulting action may be presenting an animation of a smile on a display device. As triggers occur, the function input value is updated, resulting in updates to the emotion value.

20 Claims, 9 Drawing Sheets

400

| TRIGGER LIBRARY 140 ||||
|---|---|---|---|
| TRIGGER ID 402 | TRIGGER DESCRIPTION 404 | EFFECT VALUE 142(1) | EFFECT VALUE 142(2) |
| 1 | HARDWARE FAILURE | -50 | - |
| 2 | SOFTWARE FAILURE | -40 | - |
| 3 | SUCCESSFUL COMPLETION OF A TASK | +80 | - |
| 4 | UNSUCCESSFUL COMPLETION OF THE TASK | -40 | - |
| 5 | AFFIRMATIVE USER INPUT | +40 | +5 |
| 6 | NEGATIVE USER INPUT (NON-SPECIFIC) | -10 | -2 |
| 7 | NEGATIVE USER INPUT (TASK SPECIFIC) | -30 | -5 |
| 8 | BATTERY CHARGE BELOW A THRESHOLD AMOUNT | -10 | -1 |
| 9 | TIME SINCE LAST INTERACTION WITH A USER EXCEEDS THRESHOLD | -10 | -10 |
| 10 | TIME SINCE CONCLUSION OF LAST TASK EXCEEDS THRESHOLD | -10 | -3 |
| | ... | | |

| FUNCTION LIBRARY 146 ||
|---|---|
| FUNCTION 406 | ASSOCIATED TRIGGER ID 408 |
| LOGISTIC FUNCTION (FIRST SET OF PARAMETERS) | 1-7 |
| LOGISTIC FUNCTION (SECOND SET OF PARAMETERS) WITH DECAY | 8-10 |
| LOGISTIC FUNCTION (THIRD SET OF PARAMETERS) | 8-10 |
| HYPERBOLIC TANGENT | 11-15 |
| STEP FUNCTION | 16 |
| HYSTERESIS FUNCTION | 17-35 |
| MACHINE-LEARNED FUNCTION | 36-111 |
| ... | ... |

FIG. 4

| EMOTIONAL CATEGORY LIBRARY 150 ||
|---|---|
| EMOTION VALUE RANGE 502 | EMOTIONAL CATEGORY VALUE 152 |
| -1 TO -0.75 | FRUSTRATED |
| -0.75 TO -0.45 | EMBARRASSED |
| -0.45 TO -0.2 | CONFUSED |
| -0.2 TO +0.4 | NEUTRAL |
| +0.4 TO +1.0 | HAPPY |

| BEHAVIOR LIBRARY 156 ||
|---|---|
| EMOTIONAL CATEGORY VALUE 152 | BEHAVIOR OUTPUT 158 |
| FRUSTRATED | DISPLAY FRUSTRATED FACE, TILT DISPLAY -20 DEG, 30% MAX SPEED |
| EMBARRASSED | DISPLAY EMBARRASSED FACE, 40% MAX SPEED |
| CONFUSED | DISPLAY CONFUSED FACE, ROTATE DISPLAY +15 DEG, 50% MAX SPEED |
| NEUTRAL | DISPLAY NEUTRAL FACE, TILT DISPLAY 0 DEG, 90% MAX SPEED |
| HAPPY | DISPLAY SMILEY FACE, TILT DISPLAY +20 DEG, 100% MAX SPEED |

FIG. 5

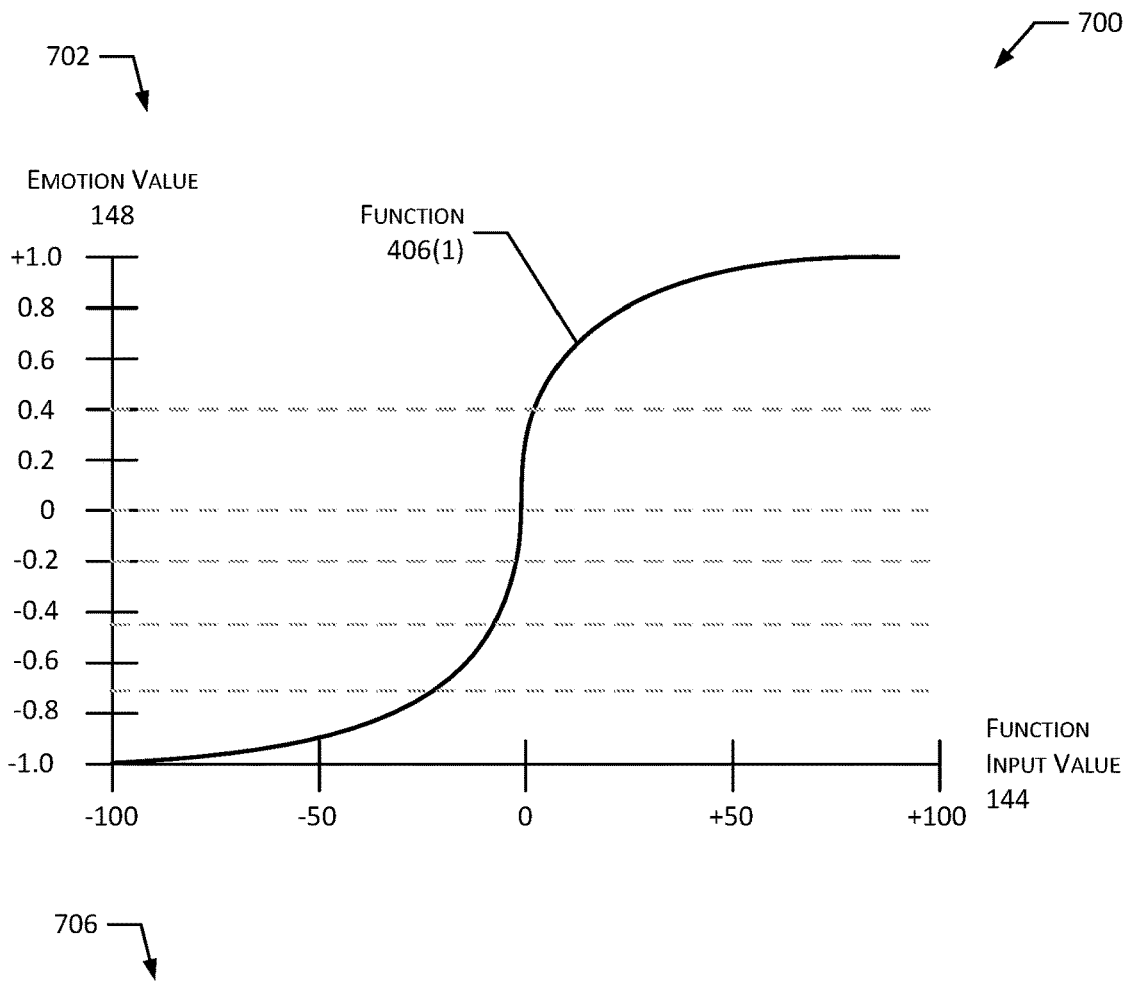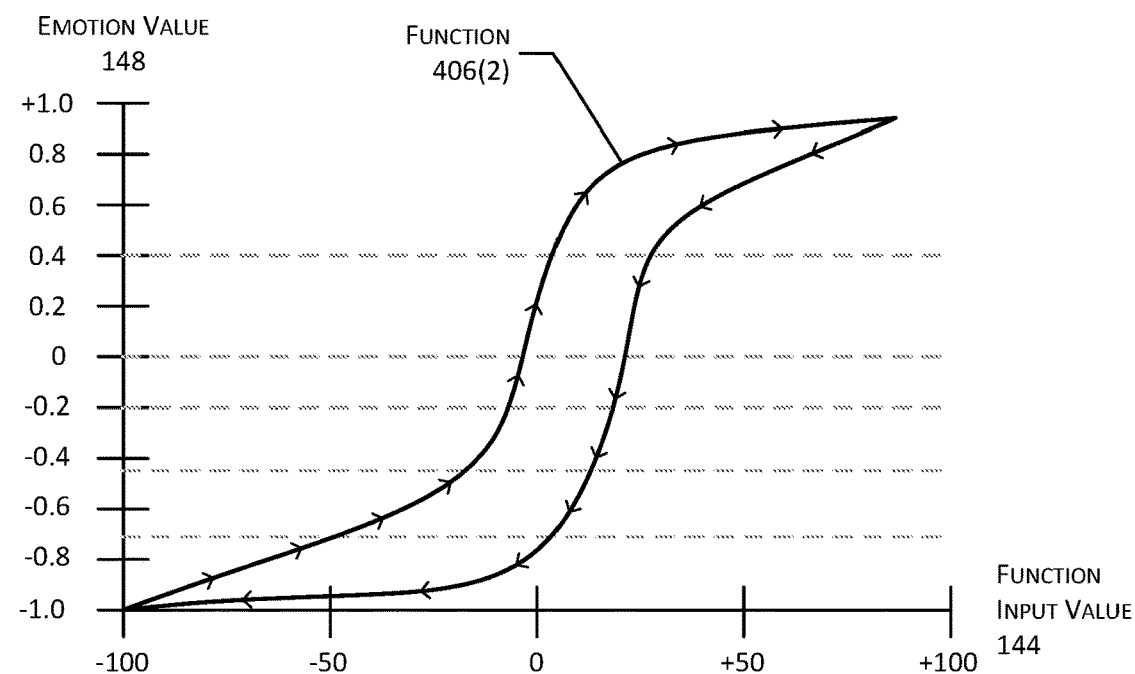
FIG. 7

SIMULATION OF EMOTIONAL STATE OF AN INTERACTIVE DEVICE

BACKGROUND

Users may interact with various interactive devices, including autonomous mobile devices (AMDs), network connected devices, and so forth.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

FIG. 4 illustrates a trigger library and a function library used to simulate emotion, according to some implementations.

FIG. 5 illustrates an emotional category library and a behavior library, according to some implementations.

FIG. 7 illustrates graphs of functions used to determine an emotion value of the interactive device, according to some implementations.

Figure 1:
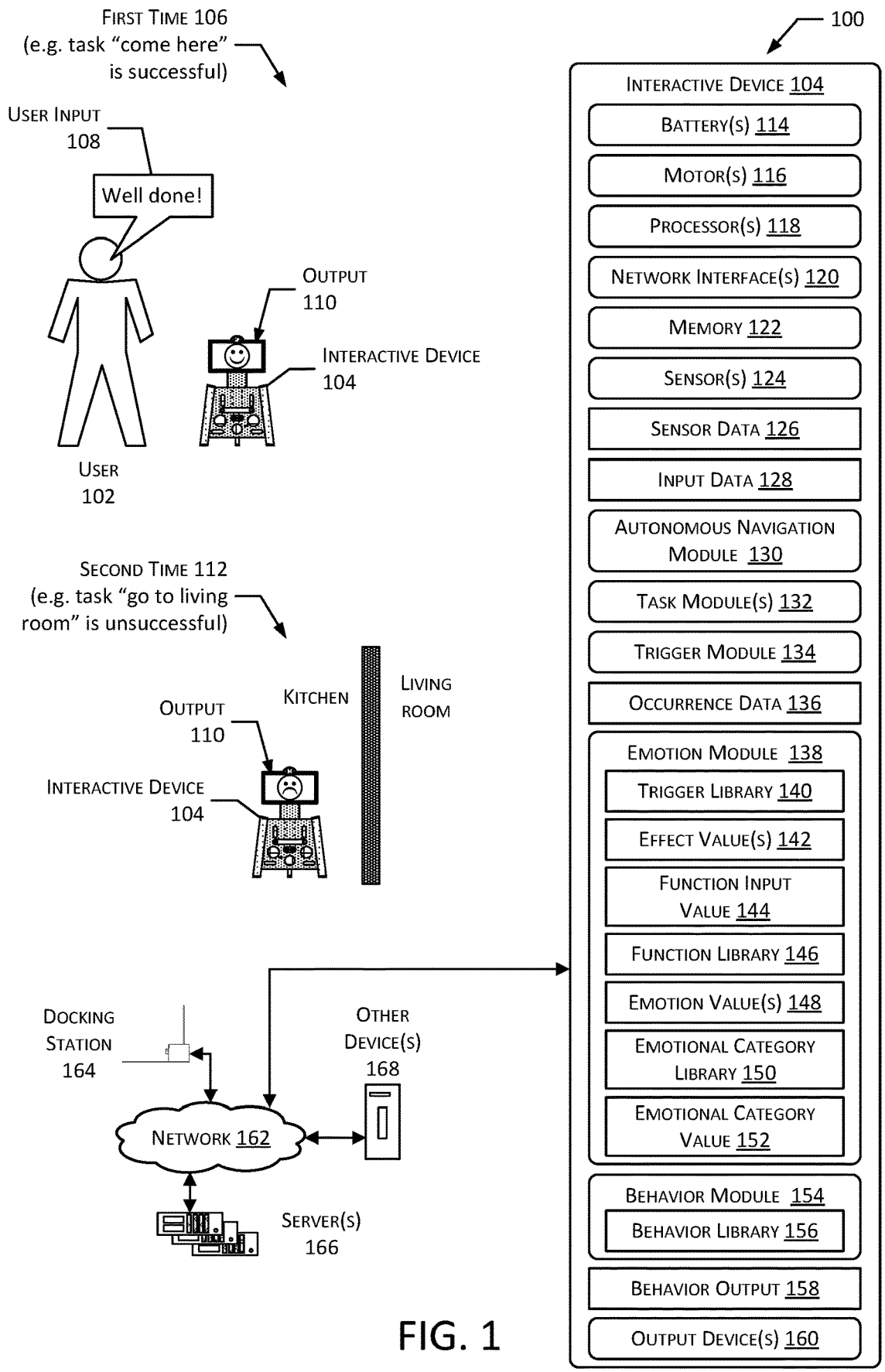
FIG. 1 illustrates a system for simulating an emotional state of an interactive device, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

DETAILED DESCRIPTION

A user may use an interactive device. The interactive device(s) may include, but are not limited to, autonomous mobile devices (AMDs) such as robots, network connected devices, home automation systems, smartphones, tablets, laptops, and so forth. The interactive device may be used to perform tasks. These tasks may include moving the AMD from one location to another autonomously, interacting with the user, patrolling a space, retrieving information, presenting content, facilitating communication with another user or system, and so forth.

Users find emotion a useful component of communication between one another. The emotion of a user or someone they are interacting with can provide critical information to facilitate that interaction. Emotion changes how participants in an interaction relate to one another, and change perception, judgment, and subsequent reaction. For example, an adult seeing a child who appears confused while trying to perform a task is likely to be more tolerant of the child's errors and provide additional guidance to the child.

Emotions also provide a mechanism to determine how engaged a user is with another party. For example, a user may have difficulty in communicating with an adult who seems distant and uninterested in the interaction.

By providing the interactive device with simulated emotions, the interactive device may be operated to exhibit behaviors corresponding to those emotions. This significantly improves how the user interacts with the interactive device, improves the user's perception of the interactive device, improves user tolerance of errors by the interactive device, increases the likelihood of future use of the interactive device, and so forth. Similar to the example above involving the child, a robot that appears confused while trying to complete a task is more likely to elicit a tolerant reaction and corrective input from the user. As a result, the user is more easily able to interact with the interactive device.

The simulated emotions and their corresponding behaviors provide an additional means for the interactive device to communicate to the user, in a fashion that is more personable and meaningful that may operate instead of, or in addition to, other communication methods such as synthesized speech or text presented on a display device.

The communication provided by the simulated emotions is non-linguistic and may be more broadly understood than speech or text in a particular language. For example, presentation of an image of a smile on a display of the interactive device may be readily understood by users who are not conversant in a particular language such as English.

Traditional systems for simulating emotions have involved either associating particular actions with particular behaviors which directly influence the emotional state. An action that is "positive" immediately changes the emotion of the device. However, this results in a highly artificial and unnatural output. These systems can exhibit a significant oscillation from one emotion to another in a very short span of time. The resulting changes in behavior can be counterproductive when used to inform the behavior of an interactive device. For example, a robot that rapidly changes from "sad" to "happy" may appear to be operating erratically. Additionally, these types of systems are complex to build and maintain. They may also result in erratic behaviors. For example, each particular action needs to be associated with a particular behavior, requiring additional maintenance. As the level of complexity increases due to more actions and more behaviors, undesired interactions begin to occur, again resulting in erratic behaviors.

Other systems have attempted to address these situations using only machine learning systems. However, these systems require significant effort to train, are opaque to those responsible for maintaining the system increasing the difficulty in maintaining the system or addressing a particular incident, are computationally intensive during operation, and so forth. For example, the addition of new triggers, new behaviors, additional emotional dimensions, or other aspects to a machine learning system results in the need for costly retraining. In essence, any change in the system may require teaching the interactive device all over again how to emotionally respond. This makes changes costly and difficult to implement.

Described in this disclosure are techniques and systems to provide one or more simulated emotion values for an interactive device. Occurrence of a trigger that is associated with the interactive device results in determination of an effect value. These triggers may involve the user, data obtained from sensors, status of the interactive device, and so forth. For example, a determination that the user 102 has uttered a wakeword may be designated as a trigger.

A function input value is maintained, which is updated responsive to the effect values of subsequent triggers. In one implementation, the function input value may be a cumulative summation of prior effect values added to the effect value of the trigger. For example, a function input value upon startup may be initialized to a value of "5". A trigger such as affirmative user input may be associated with an effect value of "+40". Upon the user providing affirmative user input such as saying "well done!" to the interactive device, the function input value would now be "+45". Other triggers such as available battery charge dropping below a threshold value, duration of time since last interaction with a user exceeding a threshold, and so forth may also have effect values that are then used to change the function input value. In some implementations, the function input value may be based on a prior emotional value, higher order functions of previously acquired data such as emotion value over time, and so forth.

Triggers may be added or removed easily and at any time. Likewise, the effect value associated with those triggers may also be updated easily and at any time. This allows for rapid deployment of the system, ongoing improvements, and eases ongoing maintenance. For example, triggers may be added or removed without affecting existing triggers.

The function input value is provided as an input to a function that provides as output an emotion value. In some implementations, the function may be designed to constrain output to between a lower limit and an upper limit. The function may be configured such that there is a non-linear relationship of input to output across the entire range of outputs from the function. For example, the function may comprise a sigmoid function, a plurality of individual linear functions that form a continuous function, a step function, and so forth. Because of the overall non-linearity, depending upon the function the degree to which the emotion value changes responsive to the function input value may vary. For example, while the interactive device has an emotion value of 0.9, an affirmative user input may only result in an emotion value of 0.91. In comparison, if the interactive device has an emotion value of −0.4, the same affirmative user input may result in a significant increase in emotion value to an emotion value of +0.6.

In some implementations different functions may be used to determine the emotion value. For example, a user may select the interactive device to have a particular "personality", which is associated with particular initialization values, a particular function, parameters for a function, and so forth. In another implementation, the function may be asymmetrical in that a positive change in the function input value may use a first function while a negative change in the function input value may use a second function. Other functions may include those developed from a machine learning system, step functions, and so forth.

Functions may be added, modified, removed, and so forth easily and at any time. This allows for rapid deployment of the system, ongoing improvements, and eases ongoing maintenance. For example, functions may be added or removed without affecting other functions.

The resulting emotion value may be stored to provide a time series that is representative of the emotion values over time. Information based on this time series may be determined. For example, the time series of emotion values over time may be analyzed to determine values of a first derivative, second derivative, third derivative, and so forth. Continuing the example, the first derivative may express an emotional velocity that is indicative of the change in emotion values between the first time and the second time. In another example, the second derivative may express an emotional acceleration indicative of a rate of change in the emotion values associated with a time. In yet another example, the third derivative may express a "jerk" that is representative of a rate of change of acceleration.

The information from the time series may be used to determine the behavior of the interactive device. For example, emotional acceleration that exceeds a threshold value may result in the interactive device increasing the brightness of a display device. Other analyses may include determining a direction of emotional change that indicates whether a change in emotion values between a first time and a second time is positive or negative.

The emotion value may be used to determine an emotional category, such as "happy" or "confused". For example, an emotional category may be associated with a specified range of emotion values. The emotional category may then be used to select one or more behaviors that are used to influence the operation of the interactive device. For example, a robot with an emotional category of "happy" may exhibit behavior of moving with a maximum speed of 1.2 meters/second (m/s). In comparison, the robot with an emotional category of "confused" may exhibit behavior of moving with a maximum speed of 0.8 m/s.

Emotional categories may be added, removed, or edited. For example, the specified limits of an emotional category may be changed without affecting other aspects of the system. This allows for rapid deployment of the system, simplifies ongoing improvements, and eases ongoing maintenance. For example, the interactive device may have two emotional categories at initial deployment. At a later time, additional emotional categories may be defined.

The behaviors associated with the emotional categories may also be added, removed, edited, and so forth. Different behaviors may be associated with particular types of interactive devices. For example, an interactive device may have one or more moveable components, such as a display screen that may be tilted. Continuing the example, the behavior may be to tilt the display responsive to the emotional category, with an upward tilt when the interactive device is "happy" and a downward tilt when the interactive device is "sad".

While many of the examples in this disclosure involve a single emotion value, it is understood that additional emotion values may be determined and used to provide simulated emotions in more than one emotional dimension at a time. For example, the emotional dimensions may include, but are not limited to: pleasure, energy, asseretiveness, loneliness, excitability, and so forth. Different emotional dimensions may use the same or different functions, functions with different parameters, and so forth. For example, the emotion value for the emotional dimension of happiness may be represented by a sigmoid function with a first set of parameters while the emotion value for the loneliness dimension may be a sigmoid function with a second set of parameters. At a given time, the interactive device may have a plurality of emotion values, each associated with a particular emotional dimension.

In some implementations a common simulated emotion may be associated with a plurality of interactive devices. For example, the user may use many interactive devices in their environment. Responsive to triggers associated with those many interactive devices, an emotion value may be determined and used in the operation of those many interactive devices.

In another implementation, a common simulated emotion may be associated with a plurality of interactive devices and a particular user. For example, a first user may interact with the many interactive devices in the environment, resulting in a first emotion value. That first emotion value may be used to operate the interactive devices during their interaction with the first user. Continuing the example, a second user who interacts with the same many interactive devices in the environment may result in a second emotion value. That second emotion value may be used to operate the interactive devices during their interaction with the second user.

By providing the interactive device with simulated emotions, the interactive device is able to communicate in a non-linguistic way to a user and overall interaction with the interactive device is improved. By being able to communicate in this fashion, users may be more tolerant of errors by the interactive device, and may also provide input that is useful for training to improve future performance.

The techniques described require minimal processing and require minimal memory to operate. The overall system is modular in nature, allowing for changes to be easily made to various portions without requiring time consuming and computationally expensive retraining. Using the techniques described in this disclosure, the resulting emotion value(s) and their changes over time responsive to various triggers results in a simulated emotional state of the interactive device that is perceived by the user as being naturalistic, in accord with the user's expectations of an interaction with a person or pet.

Illustrative System

FIG. 1 illustrates a system 100 for simulating an emotional state of an interactive device, according to some implementations. A user 102 may use an interactive device 104. The interactive device 104 may comprise an autonomous mobile device (AMD) such as a robot, network connected device, home automation system, smartphone, tablet, laptop, and so forth.

In this illustration, a first time 106 is shown at which the interactive device 104 comprises an AMD which has successfully completed the task to "come here" in response to a command by the user 102. The successful completion of the task is a first trigger, which results in an increase in an emotion value of the interactive device 104. After the interactive device 104 arrives, the user 102 provides user input 108 by saying aloud "well done!" which is a second trigger. Responsive to this trigger, the emotion value of the interactive device 104 increases again. The triggers and the resulting changes in emotion value are described in more detail below. The emotion value may be used to influence output 110 by the interactive device 104. For example, the output 110 may comprise audio presented by a speaker, images presented by a display device, movement of one or more parts of the interactive device 104, and so forth. In this illustration the emotion value is greater than a threshold that is deemed representative of an emotional category of "happy" and so the output 110 comprising an image of a smiling face is presented on a display device.

A second time 112 is also shown at which the interactive device 104 has been directed to perform a task "go to living room" but the interactive device 104 is unsuccessful in completing the task. For example, a door to the living room may be closed or another obstacle may prevent the interactive device 104 from completing the movement. The unsuccessful completion of the task is a third trigger, which results in a decrease in the emotion value of the interactive device 104. The emotion value may be used to influence the output 110 of the interactive device 104. In the example shown, the emotion value is less than the threshold that is deemed representative of the emotional category of "happy" and so the output 110 comprising an image of a frowning face is presented on the display device.

The interactive device 104 may include a battery(s) 114 to provide electrical power for operation of the interactive device 104. The battery 114 may be rechargeable, allowing it to store electrical energy obtained from an external source. In other implementations the interactive device 104 may be connected to an external power source and the battery 114 may be omitted. In some implementations in which a battery 114 is used, a wireless power receiver may be used to provide power for operation of the interactive device 104, recharge the battery 114, and so forth.

One or more motors 116 or other actuators may enable the interactive device 104 to move at least a portion of the interactive device 104, or move the entire interactive device 104 from one location in the physical space to another. In one example, a motor 116 may be used to pan, tilt, or rotate a display of the interactive device 104. In another example, the motor 116 may drive a wheel attached to a chassis of the interactive device 104 which causes the interactive device 104 to move. Continuing the example, the interactive device 104 may turn, move forward, move backward, and so forth.

During use, the user 102 may provide user input 108, such as a command. For example, the user 102 may provide speech input by uttering the command "robot, come here". In another example, the user 102 may provide the user input 108 that indicates the command using another computing device, such as a smartphone or tablet computer. Data indicative of the user input 108 or corresponding command may then be provided to the interactive device 104.

The interactive device 104 may include one or more hardware processors 118 (processors) configured to execute one or more stored instructions. The processors 118 may comprise one or more cores. The processors 118 may include microcontrollers, systems on a chip (SoC), field programmable gate arrays, digital signal processors, graphic processing units, general processing units, and so forth.

The interactive device 104 may include one or more network interfaces 120. The network interfaces 120 may include devices to connect to personal area networks (PANs), local area networks (LANs), wireless local area networks (WLANS), wide area networks (WANs), and so forth. For example, the network interfaces 120 may include devices compatible with Ethernet, Wi-Fi, Bluetooth, Bluetooth Low Energy, ZigBee, and so forth.

The interactive device 104 includes one or more memories 122. The memory 122 may comprise one or more non-transitory computer-readable storage media (CRSM).

The interactive device 104 may include one or more sensors 124. For example, the sensors 124 may include cameras, microphones, LIDAR, and so forth. The sensors 124 may generate sensor data 126. The sensors 124 are discussed in more detail with regard to FIG. 3.

During operation the interactive device 104 may determine input data 128. The input data 128 may include or be based at least in part on sensor data 126 from the sensors 124 onboard the interactive device 104. In one implementation, a speech processing module may process raw audio data obtained by a microphone on the interactive device 104 and produce input data 128. For example, the user may say "robot, come here" which may produce input data 128 "come here".

An autonomous navigation module 130 provides the interactive device 104 with the ability to navigate within the physical space without real-time human interaction. The autonomous navigation module 130 may implement, or operate in conjunction with the other modules described herein. The autonomous navigation module 130 may generate a path plan that is indicative of a path through the physical space from a first location to a second location. The interactive device 104 may then begin moving along the path. In some implementations, the autonomous navigation module 130 may generate a plurality of path plans.

While moving along the path, the interactive device 104 may generate sensor data 126 from the sensors 124. The sensor data 126 is processed to assess the physical space, determine obstacles, and update or change the path as appropriate to avoid the obstacles and reach the second location. For example, if an obstacle appears in the path, a mapping module may determine the presence of the obstacle. The autonomous navigation module 130 may then plan an alternative path to the second location. This may result in a modification of the path plan currently in use, or generation of a new path plan. The autonomous navigation module 130 is discussed in more detail with regard to FIG. 2.

The interactive device 104 may utilize one or more task modules 132. The task module 132 comprises instructions that, when executed, provide one or more functions. The task modules 132 may perform functions such as finding a user, following a user, presenting output on output devices 160 of the interactive device 104, perform sentry tasks by moving the interactive device 104 through the physical space to determine the presence of unauthorized people, and so forth.

A trigger module 134 determines the occurrence of one or more triggers. The trigger module 134 may use sensor data 126, input data 128, output from one or more task modules 132, and so forth to generate occurrence data 136. The trigger module 134 may compare the inputs to previously stored trigger thresholds to determine if a trigger has occurred. For example, presence of a user 102 may be a trigger, and sensor data 126 indicative of a presence of a user 102 may result in the trigger module 134 providing occurrence data 136 indicative of presence of the user 102. In some implementations the trigger module 134 may use information such as timestamp data indicative of when a trigger has occurred to determine the sequence of triggers. Some triggers may be delayed in their determination. For example, sensor data 126 from a camera may be acquired at time t=0, and then take until time t=4 to process and determine the occurrence of a first trigger. Continuing the example, sensor data 126 from a contact switch may be acquired at time t=1 and then take until time t=2 to be processed and determine occurrence of a second trigger. The trigger module 134 may determine the timestamps associated with occurrences, such as when sensor data 126 was obtained, and use this timestamp to sequence the occurrence data 136. Continuing the example, the occurrence data 136 would indicate that the first trigger occurred first, and the second trigger occurred next.

The triggers may be associated with status of the interactive device 104. For example, triggers may include a hardware fault, software fault, battery charge below a threshold value, and so forth.

The occurrence data 136 associated with a trigger may exhibit different bit depths in different implementations. For example, the occurrence data 136 may have a bit depth of 1, indicating whether the trigger occurred or not. In another example, the occurrence data 136 may have a bit depth of 8 bits, allowing for the indication of 256 possible values. In some implementations the occurrence data 136 may be indicative of a confidence value that is indicative of a likelihood that the trigger actually occurred. For example, the confidence value may be based on noise present in the input(s) to the trigger module 134.

The occurrence data 136 may be provided to an emotion module 138. The emotion module 138 may use a trigger library 140 to determine one or more effect values 142 associated with the occurrence of the trigger indicated by the occurrence data 136. The trigger library 140 associates a particular trigger as indicated by the occurrence data 136 with one or more effect values 142. For example, occurrence data 136 indicative of a hardware failure may be associated with an effect value 142 of "−50". The trigger library 140 and examples of triggers are discussed with regard to FIG. 4.

In some implementations the occurrence data 136 may be determined by other modules. For example, the autonomous navigation module 130, the task module(s) 132, and so forth may be configured to determine occurrence data 136.

A function input value 144 is determined. For example, historical data such as a previously determined function input value 144 may be combined with the effect value 142 to determine the function input value 144. The combination of the previously determined function input value 144 and the effect value 142 may comprise addition, multiplication, exponentiation, and so forth. In other implementations other data may be used to determine the function input value 144.

A function library 146 may comprise one or more functions. A particular function may be associated with particular types of triggers. A function is configured to accept as input an effect value, such as the function input value 144, and provide as output one or more emotion value(s) 148. For example, a single function input value 144 may provide as output a single emotion value 148 in a situation where a single emotional dimension is used to simulate emotion. In another example, a first function input value 144(1) representative of a first emotional dimension and a second function input value 144(2) representative of a second emotional dimension may be provided as input. The function may provide as output a first emotion value 148(1) and a second emotion value 148(2).

In some implementations, the function may be designed to constrain output to between a lower limit and an upper limit. For example, the function may provide an emotion value 148 which is between −1 and +1. The function may be configured such that there is a non-linear relationship of input to output across the entire range of outputs from the function. For example, the function may comprise a sigmoid function, a plurality of individual linear functions that form a continuous function, a step function, and so forth. Because of the overall non-linearity, depending upon the function the degree to which the emotion value 148 changes responsive to the function input value 144 may vary. For example, while the interactive device 104 has an emotion value 148 of 0.9, an affirmative user input 108 may only result in an emotion value 148 of 0.91. In comparison, if the interactive device 104 has an emotion value 148 of −0.4, the same affirmative user input 108 may result in a significant increase in emotion value 148 to an emotion value 148 of +0.6. The functions are discussed in more detail with regard to FIG. 4.

In some implementations, the emotion value 148 may be expressed as a vector value. For example, the system 100 may utilize an emotional space with two dimensions. The emotion value 148 may be expressed as a vector value within that space.

An emotional category library 150 associates particular emotion values 148 or ranges of emotion values 148 with particular emotional category values 152. For example, an emotion value 148 range of +0.4 to +1.0 may be associated with an emotional category value 152 of "happy". The emotional category value 152 may be used to influence operation of the interactive device 104. For example, the emotional category value 152 may be provided to a behavior module 154. Operation of the emotion module 138 is discussed in more detail with regard to FIG. 6.

A behavior module 154 may accept as input the emotion value 148, emotional category value 152, or other information. A behavior library 156 is used to associate particular emotion values 148 or emotional category values 152 with behavior output 158 that is then implemented using one or more output devices 160. For example, an emotional category value 152 of "happy" may be associated with behavior output 158 of "display smiley face animation on display device of interactive device 104, tilt display device of interactive device 104 to +20 degrees, allow movement at up to 100% the maximum permitted speed". As another example, an emotional category value 152 of "confused" may be associated with behavior output 158 of "display confused face animation on display device of interactive device 104, rotate display device of interactive device by +15 degrees, allow movement at up to 50% maximum permitted speed".

While a single behavior module 154 is depicted, in some implementations additional behavior modules 154 may be used. For example, a particular behavior module 154 may be associated with a specified set of one or more output devices 160.

Modules described herein, such as the autonomous navigation module 130, trigger module 134, and so forth, may provide various processing functions such as de-noising, filtering, and so forth. Processing of sensor data 126, such as image data from a camera, may be performed by a module implementing, at least in part, one or more of the following tools or techniques. In one implementation, processing of image data may be performed, at least in part, using one or more tools available in the OpenCV library as developed by Intel Corporation of Santa Clara, Calif., USA; Willow Garage of Menlo Park, Calif., USA; and Itseez of Nizhny Novgorod, Russia. In another implementation, functions available in the OKAO machine vision library as promulgated by Omron Corporation of Kyoto, Japan, may be used to process the sensor data 126. In still another implementation, functions such as those in the Machine Vision Toolbox (MVTB) available using MATLAB as developed by Math Works, Inc. of Natick, Mass., USA, may be utilized.

Techniques such as artificial neural networks (ANNs), convolutional neural networks (CNNs), active appearance models (AAMs), active shape models (ASMs), principal component analysis (PCA), cascade classifiers, and so forth, may also be used to process the sensor data 126 or other data. For example, the ANN may be trained using a supervised learning algorithm such that object identifiers are associated with images of particular objects within training images provided to the ANN. Once trained, the ANN may be provided with the sensor data 126 and produce output indicative of the object identifier.

The interactive device 104 includes one or more output devices 160, such as one or more of a motor 116, light, speaker, display, projector, printer, and so forth. The one or more output devices 160 may be used to provide output during operation of the interactive device 104. The output devices 160 are discussed in more detail with regard to FIG. 3.

The interactive device 104 may use the network interfaces 120 to connect to a network 162. For example, the network 162 may comprise a wireless local area network, that in turn is connected to a wide area network such as the Internet.

The interactive device 104 may be configured to dock or connect to a docking station 164. The docking station 164 may also be connected to the network 162. For example, the docking station 164 may be configured to connect to the wireless local area network 162 such that the docking station 164 and the interactive device 104 may communicate. The docking station 164 may provide external power which the interactive device 104 may use to charge the battery 114.

The interactive device 104 may access one or more servers 166 via the network 162. For example, the interactive device 104 may utilize a wakeword detection module to determine if the user 102 is addressing a request to the interactive device 104. The wakeword detection module may hear a specified word or phrase and transition the interactive device 104 or portion thereof to the wake operating mode. Once in the wake operating mode, the interactive device 104 may then transfer at least a portion of the audio spoken by the user 102 to one or more servers 166 for further processing. The servers 166 may process the spoken audio and return to the interactive device 104 data that may be subsequently used to operate the interactive device 104.

The interactive device 104 may also communicate with other devices 168. The other devices 168 may include one or more devices that are within the home or associated with operation of one or more devices in the home. For example, the other devices 168 may include a thermostat, doorbell camera, a garage door opener, a refrigerator, washing machine, and so forth. In some implementations the other devices 168 may include other interactive devices 104, vehicles, and so forth.

Figure 2:
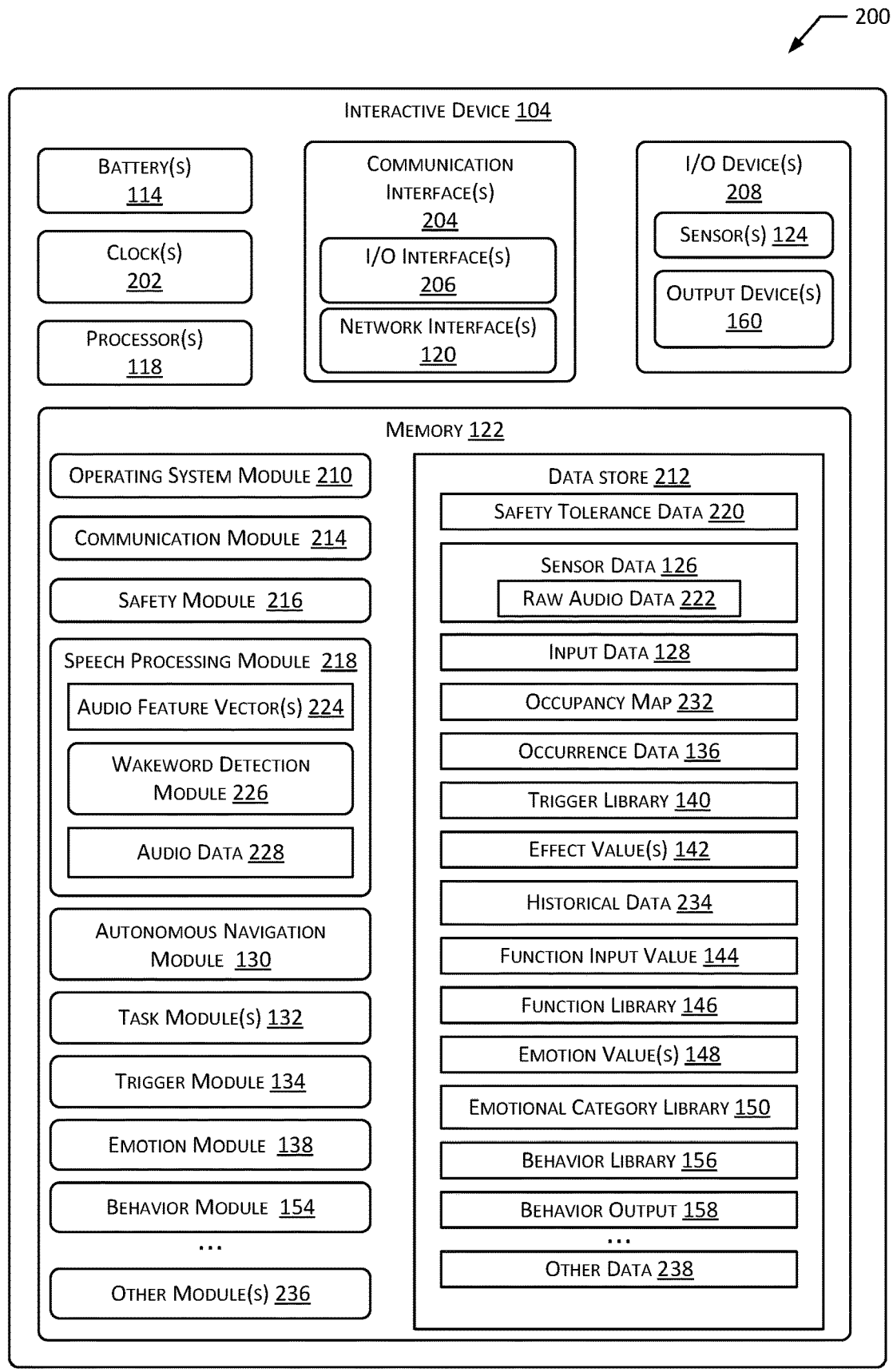
FIG. 2 is a block diagram of the components of an interactive device such as an autonomous mobile device (AMD), according to some implementations.

FIG. 2 is a block diagram 200 of the components of the interactive device 104, according to some implementations. The interactive device 104 may include one or more batteries 114 to provide electrical power suitable for operating the components in the interactive device 104. In some implementations other devices may be used to provide electrical power to the interactive device 104. For example, power may be provided by wireless power transfer, capacitors, fuel cells, storage flywheels, connection to an electrical main or building power, and so forth.

One or more clocks 202 may provide information indicative of date, time, ticks, and so forth. For example, the processor 118 may use data from the clock 202 to associate a particular time with an action, sensor data 126, and so forth.

The interactive device 104 may include one or more hardware processors 118 (processors) configured to execute one or more stored instructions. The processors 118 may comprise one or more cores. The processors 118 may include microcontrollers, systems on a chip, field programmable gate arrays, digital signal processors, graphic processing units, general processing units, and so forth.

The interactive device 104 may include one or more communication interfaces 204 such as input/output (I/O) interfaces 206, network interfaces 120, and so forth. The communication interfaces 204 enable the interactive device 104, or components thereof, to communicate with other devices 168 or components. The communication interfaces 204 may include one or more I/O interfaces 206. The I/O interfaces 206 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 206 may couple to one or more I/O devices 208. The I/O devices 208 may include input devices such as one or more of a sensor 124, keyboard, mouse, scanner, and so forth. The I/O devices 208 may also include output devices 160 such as one or more of a motor 116, light, speaker, display, projector, printer, and so forth. In some embodiments, the I/O devices 208 may be physically incorporated with the interactive device 104 or may be externally placed.

The network interfaces 120 may be configured to provide communications between the interactive device 104 and other devices 168 such as other Interactive devices 104, docking stations 164, routers, access points, and so forth. The network interfaces 120 may include devices configured to couple to personal area networks (PANs), local area networks (LANs), wireless local area networks (WLANS), wide area networks (WANs), and so forth. For example, the network interfaces 120 may include devices compatible with Ethernet, Wi-Fi, Bluetooth, Bluetooth Low Energy, ZigBee, and so forth.

The interactive device 104 may also include one or more buses or other internal communications hardware or software that allow for the transfer of data between the various modules and components of the interactive device 104.

As shown in FIG. 2, the interactive device 104 includes one or more memories 122. The memory 122 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 122 provides storage of computer-readable instructions, data structures, program modules, and other data for the operation of the interactive device 104. A few example functional modules are shown stored in the memory 122, although the same functionality may alternatively be implemented in hardware, firmware, or as a system on a chip (SoC).

The memory 122 may include at least one operating system (OS) module 210. The OS module 210 is configured to manage hardware resource devices such as the I/O interfaces 206, the I/O devices 208, the communication interfaces 204, and provide various services to applications or modules executing on the processors 118. The OS module 210 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Wash., USA; the AMD Operating System (ROS), and so forth.

Also stored in the memory 122 may be a data store 212 and one or more of the following modules. These modules may be executed as foreground applications, background tasks, daemons, and so forth. The data store 212 may use a flat file, database, linked list, tree, executable code, script, or other data structure to store information. In some implementations, the data store 212 or a portion of the data store 212 may be distributed across one or more other devices 168 including other interactive devices 104, servers 166, network attached storage devices, and so forth.

A communication module 214 may be configured to establish communication with other devices 168, such as other interactive devices 104, an external server 166, a docking station 164, and so forth. The communications may be authenticated, encrypted, and so forth.

Other modules within the memory 122 may include a safety module 216, a speech processing module 218, the autonomous navigation module 130, the one or more task modules 132, the trigger module 134, the emotion module 138, the behavior module 154, or other modules 236. The modules may access data stored within the data store 212, including safety tolerance data 220, sensor data 126, an occupancy map 232, other data 238, and so forth.

The safety module 216 may access the safety tolerance data 220 to determine within what tolerances the interactive device 104 may operate safely within the physical space. For example, the safety module 216 may be configured to stop the interactive device 104 from moving when an extensible mast of the interactive device 104 is extended. In another example, the safety tolerance data 220 may specify a minimum sound threshold which, when exceeded, stops all movement of the interactive device 104. Continuing this example, detection of sound such as a human yell would stop the interactive device 104. In another example, the safety module 216 may access safety tolerance data 220 that specifies a minimum distance from an object that the interactive device 104 is to maintain. Continuing this example, when a sensor 124 detects an object has approached to less than the minimum distance, all movement of the interactive device 104 may be stopped. Movement of the interactive device 104 may be stopped by one or more of inhibiting operations of one or more of the motors 116, issuing a command to stop motor operation, disconnecting power from one or more the motors 116, and so forth. In other implementations, the safety module 216 may use the safety tolerance data 220 to determine tolerances for the control of other devices 168 by the interactive device 104. The safety module 216 may be implemented as hardware, software, or a combination thereof.

The safety module 216 may control other factors, such as a maximum speed of the interactive device 104 based on information obtained by the sensors 124, precision and accuracy of the sensor data 126, and so forth. For example, detection of an object by an optical sensor may include some error, such as when the distance to an object comprises a weighted average between an object and a background. As a result, the maximum speed permitted by the safety module 216 may be based on one or more factors such as the weight of the interactive device 104, nature of the floor, distance to the object, and so forth. In the event that the maximum permissible speed differs from the maximum speed permitted by the safety module 216, the lesser speed may be utilized.

The speech processing module 218 may be used to process utterances of the user 102. Microphones may acquire audio in the presence of the interactive device 104 and may send raw audio data 222 to an acoustic front end (AFE). The AFE may transform the raw audio data 222 (for example, a single-channel, 16-bit audio stream sampled at 16 kHz), captured by the microphone, into audio feature vectors 224 that may ultimately be used for processing by various components, such as a wakeword detection module 226, speech recognition engine, or other components. The AFE may reduce noise in the raw audio data 222. The AFE may also perform acoustic echo cancellation (AEC) or other operations to account for output audio data that may be sent to a speaker of the interactive device 104 for output. For example, the interactive device 104 may be playing music or other audio that is being received from a network 162 in the form of output audio data. To avoid the output audio interfering with the device's ability to detect and process input audio, the AFE or other component may perform echo cancellation to remove the output audio data from the input raw audio data 222, or other operations.

The AFE may divide the raw audio data 222 into frames representing time intervals for which the AFE determines a number of values (i.e., features) representing qualities of the raw audio data 222, along with a set of those values (i.e., a feature vector or audio feature vector 224) representing features/qualities of the raw audio data 222 within each frame. A frame may be a certain period of time, for example a sliding window of 25 ms of audio data 228 taken every 10 ms, or the like. Many different features may be determined, as known in the art, and each feature represents some quality of the audio that may be useful for automatic speech recognition (ASR) processing, wakeword detection, presence detection, or other operations. A number of approaches may be used by the AFE to process the raw audio data 222, such as mel-frequency cepstral coefficients (MFCCs), log filter-bank energies (LFBEs), perceptual linear predictive (PLP) techniques, neural network feature vector techniques, linear discriminant analysis, semi-tied covariance matrices, or other approaches known to those skilled in the art.

The audio feature vectors 224 (or the raw audio data 222) may be input into a wakeword detection module 226 that is configured to detect keywords spoken in the audio. The wakeword detection module 226 may use various techniques to determine whether audio data 228 includes speech. Some embodiments may apply voice activity detection (VAD) techniques. Such techniques may determine whether speech is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the interactive device 104 may implement a limited classifier configured to distinguish speech from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in speech storage, which acoustic models may include models corresponding to speech, noise (such as environmental noise or background noise), or silence. Still other techniques may be used to determine whether speech is present in the audio input.

Once speech is detected in the audio received by the interactive device 104 (or separately from speech detection), the interactive device 104 may use the wakeword detection module 226 to perform wakeword detection to determine when a user 102 intends to speak a command to the interactive device 104. This process may also be referred to as keyword detection, with the wakeword being a specific example of a keyword. Specifically, keyword detection is typically performed without performing linguistic analysis, textual analysis, or semantic analysis. Instead, incoming audio is analyzed to determine if specific characteristics of the audio match preconfigured acoustic waveforms, audio signatures, or other data to determine if the incoming audio "matches" stored audio data corresponding to a keyword.

Thus, the wakeword detection module 226 may compare audio data 228 to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds HMMs for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating a hybrid deep neural network (DNN) Hidden Markov Model (HMM) decoding framework. In another embodiment, the wakeword spotting system may be built on DNN/recursive neural network (RNN) structures directly, without HMM involved. Such a system may estimate the posteriors of wakewords with context information, either by stacking frames within a context window for DNN, or using RNN. Following on, posterior threshold tuning or smoothing is applied for decision making. Other techniques for wakeword detection, such as those known in the art, may also be used.

Once the wakeword is detected, circuitry or applications of the local interactive device 104 may "wake" and begin transmitting audio data 228 (which may include one or more of the raw audio data 222 or the audio feature vectors 224) to one or more server(s) 166 for speech processing. In some implementations at least a portion of the speech processing may be performed by the interactive device 104. The audio data 228 corresponding to audio obtained by the microphone may be processed locally on one or more of the processors 118, sent to a server 166 for routing to a recipient device or may be sent to the server 166 for speech processing for interpretation of the included speech (either for purposes of enabling voice-communications and/or for purposes of executing a command in the speech). The audio data 228 may include data corresponding to the wakeword, or the portion of the audio data 228 corresponding to the wakeword may be removed by the interactive device 104 before sending to the server 166. The trigger module 134 may also generate occurrence data 136 indicative of the occurrence of the wakeword.

The speech processing module 218 may include or access an automated speech recognition (ASR) module. The ASR module may accept as input raw audio data 222, audio feature vectors 224, or other sensor data 126 and so forth and may produce as output the input data 128 comprising a text string or other data representation. The input data 128 comprising the text string or other data representation may be processed to determine the command to be executed. For example, the utterance of the command "robot, come here"

may result in input data 128 comprising the text string "come here". The wakeword "robot" may be omitted from the input data 128.

The autonomous navigation module 130 provides the interactive device 104 with the ability to navigate within the physical space without real-time human interaction. The autonomous navigation module 130 may implement, or operate in conjunction with, the mapping module to determine an occupancy map 232, or other representation of the physical space.

A mapping module (not shown) generates an occupancy map 232 that is representative of the physical features in the physical space. For example, the sensors 124 may comprise one or more cameras that obtain sensor data 126 comprising image data of the physical space. The image data may be processed to determine the presence of obstacles. The occupancy map 232 may comprise data that indicates the location of one or more obstacles, such as a table, wall, stairwell, and so forth. In some implementations, the occupancy map 232 may comprise a plurality of cells with each cell of the plurality of cells representing a particular area in the physical space. Data may be stored that indicates whether a cell contains an obstacle. An obstacle may comprise an object or feature that prevents or impairs traversal by the interactive device 104. For example, an obstacle may comprise a wall, stairwell, and so forth. Cells that have an obstacle value above a threshold value that is indicative of containing an obstacle may be deemed to not be traversable by the interactive device 104. Cells that have obstacle values less than the threshold value may be deemed traversable by the interactive device 104.

The occupancy map 232 may be manually or automatically determined. For example, during a learning phase the user 102 may take the interactive device 104 on a tour of the physical space, allowing the interactive device 104 to generate the occupancy map 232 and associated data, such as tags designating a particular obstacle type, such as "furniture" or "fragile". In another example, during subsequent operation, the interactive device 104 may generate the occupancy map 232 that is indicative of locations and types of obstacles such as chairs, doors, stairwells, and so forth as it moves unattended through the physical space.

In one implementation, the mapping module may use one or more simultaneous localization and mapping ("SLAM") techniques. The SLAM algorithms may utilize one or more of maps, algorithms, beacons, or other techniques to navigate. The autonomous navigation module 130 may use the occupancy map 232 to determine a set of path plans that include possible paths along which the interactive device 104 may move. One of these path plans may be selected and used to move the interactive device 104. For example, a possible path that is the shortest, has the fewest turns, or the lowest predicted temperature on arrival, may be selected and used. The selected path plan is then used to determine a set of commands that drive the motors 116 connected to the wheels. For example, the autonomous navigation module 130 may determine the first location within the physical space and determine a path to the second location, and the speed of the interactive device 104 at various portions of the path.

The autonomous navigation module 130 may utilize various techniques during processing of sensor data 126. For example, image data obtained from cameras on the interactive device 104 may be processed to determine one or more of corners, edges, planes, and so forth. In some implementations, corners may be detected and the coordinates of those corners may be used to produce point cloud data. This point cloud data may then be used for SLAM or other purposes associated with mapping, navigation, and so forth.

The interactive device 104 may move responsive to a determination made by an onboard processor 118, in response to a command received from one or more communication interfaces 204, as determined from the sensor data 126, and so forth. For example, an external server 166 may send a command that is received using the network interface 120. This command may direct the interactive device 104 to proceed to find a particular user 102, follow a particular user 102, and so forth. The interactive device 104 may then process this command and use the autonomous navigation module 130 to determine the directions and distances associated with carrying out the command. For example, the command to "come here" may result in a task module 132 sending a command to the autonomous navigation module 130 to move the interactive device 104 to a particular location near the user 102 and orient the interactive device 104 in a particular direction. The trigger module 134 may generate occurrence data 136 indicative of successful completion of autonomous navigation, unsuccessful completion, error conditions, and so forth.

The interactive device 104 may connect to the network 162 using one or more of the network interfaces 120. In some implementations, one or more of the modules or other functions described here may execute on the processors 118 of the interactive device 104, on the server 166, or a combination thereof. For example, one or more servers 166 may provide various functions, such as ASR, natural language understanding (NLU), providing content such as audio or video to the interactive device 104, and so forth.

Figure 6:
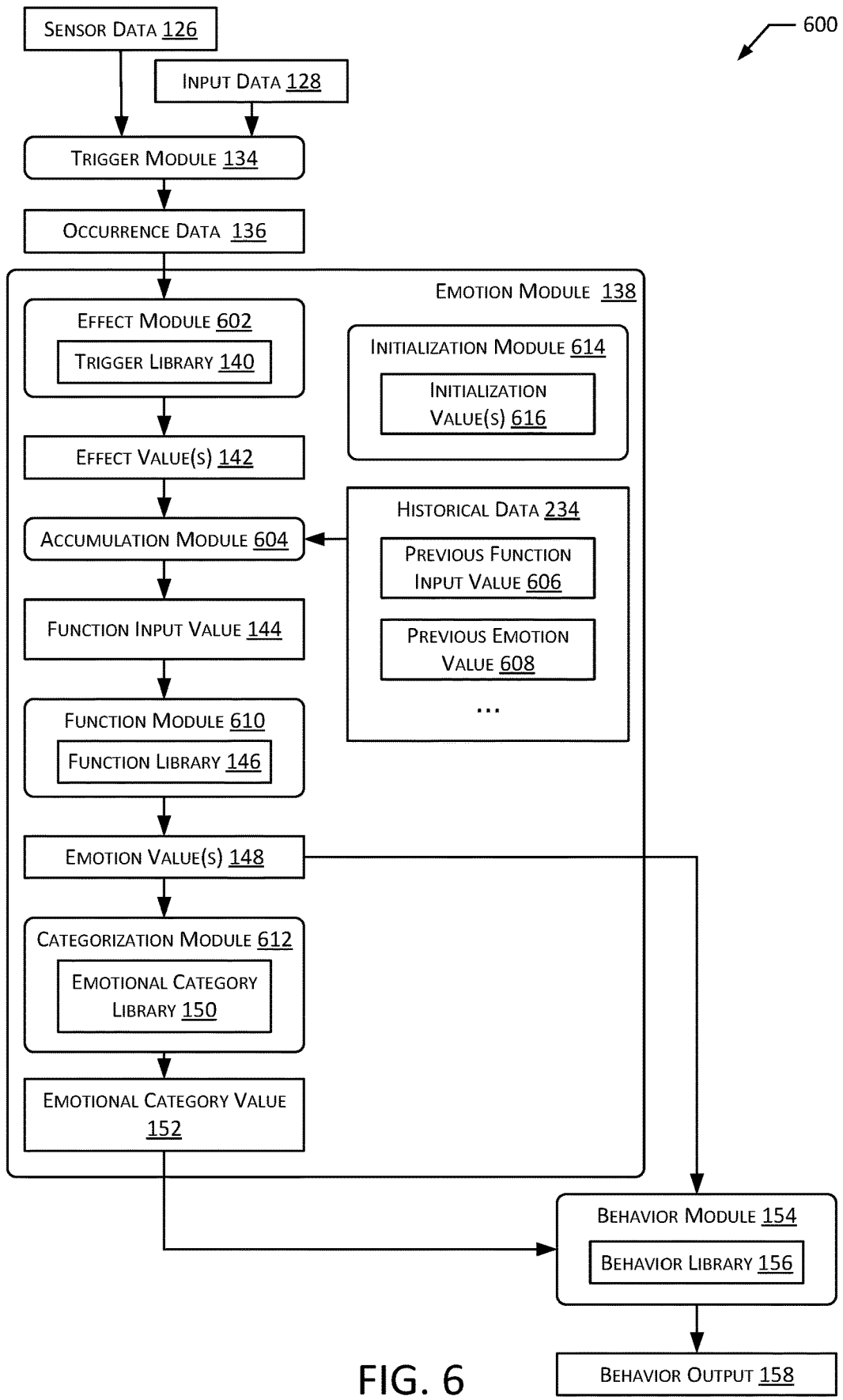
FIG. 6 illustrates a system to simulate an emotional state, according to some implementations.

The trigger module 134, emotion module 138, and behavior module 154 are discussed in more detail with regard to FIG. 6. In some implementations historical data 234 may be stored in the data store 212. For example, the historical data 234 may comprise data indicative of a time or sequence and associated information such as previous function input values 144, emotion values 148, and so forth.

The other modules 236 may provide other functionality, such as object recognition, speech synthesis, user identification, and so forth. The other modules 236 may comprise a speech synthesis module that is able to convert text data to human speech. For example, the speech synthesis module may be used by the interactive device 104 to provide speech that a user 102 is able to understand.

The data store 212 may store the other data 238 as well. For example, localization settings may indicate local preferences such as language, user identifier data may be stored that allows for identification of a particular user 102, and so forth.

Figure 3:
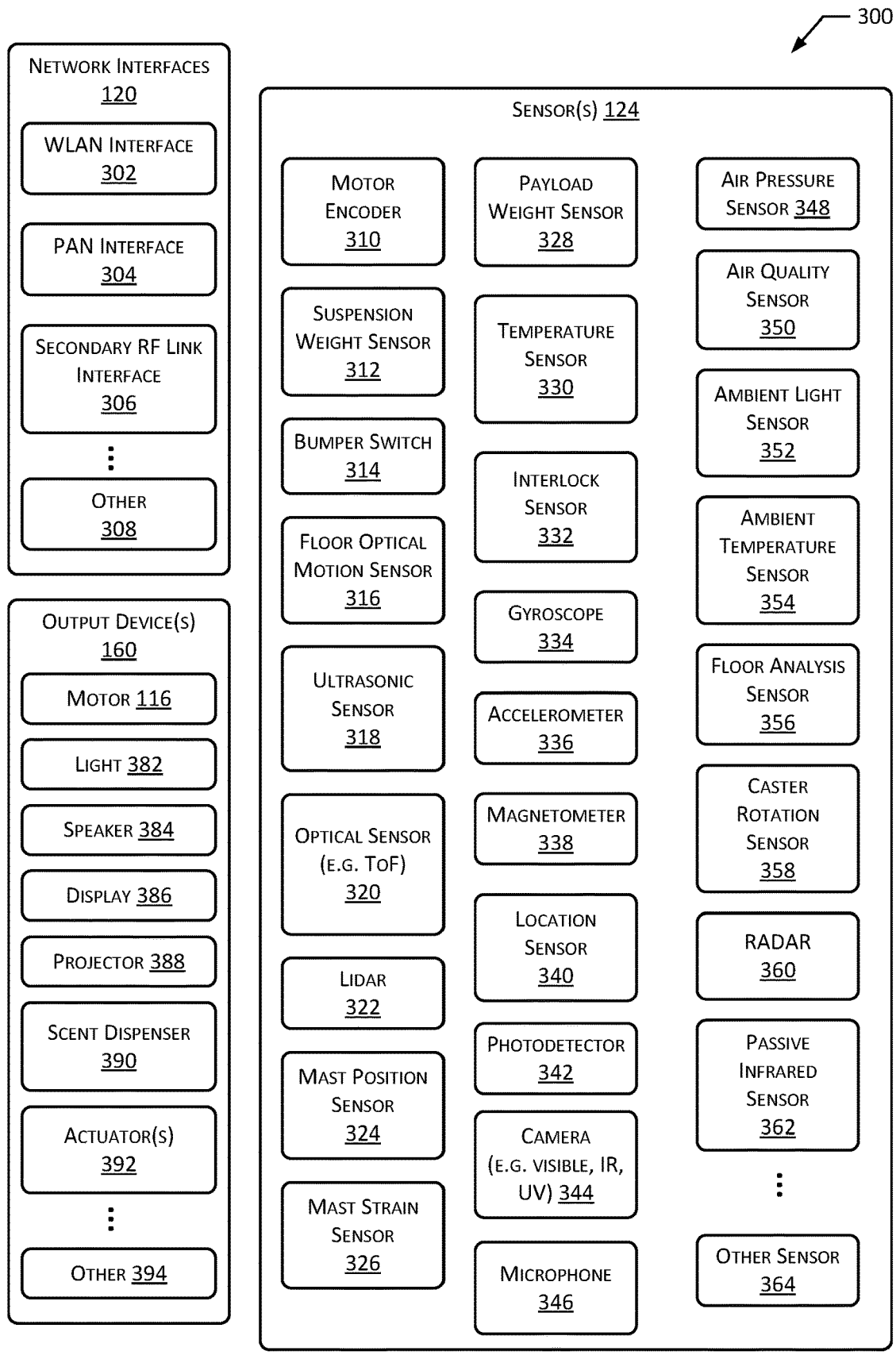
FIG. 3 is a block diagram of some components of the interactive device, such as network interfaces, sensors, and output devices, according to some implementations.

FIG. 3 is a block diagram 300 of some components of the interactive device 104 such as network interfaces 120, sensors 124, and output devices 160, according to some implementations. The components illustrated here are provided by way of illustration and not necessarily as a limitation. For example, the interactive device 104 may utilize a subset of the particular network interfaces 120, output devices 160, or sensors 124 depicted here, or may utilize components not pictured. One or more of the sensors 124, output devices 160, or a combination thereof may be included on a moveable component that may be panned, tilted, rotated, or any combination thereof with respect to a chassis of the interactive device 104. The trigger module 134 may generate occurrence data 136 based on the sensor data 126 provided by the one or more sensors 124.

The network interfaces 120 may include one or more of a WLAN interface 302, PAN interface 304, secondary radio frequency (RF) link interface 306, or other interface 308. The WLAN interface 302 may be compliant with at least a portion of the Wi-Fi specification. For example, the WLAN interface 302 may be compliant with at least a portion of the IEEE 802.11 specification as promulgated by the Institute of Electrical and Electronics Engineers (IEEE). The PAN interface 304 may be compliant with at least a portion of one or more of the Bluetooth, wireless USB, Z-Wave, ZigBee, or other standards. For example, the PAN interface 304 may be compliant with the Bluetooth Low Energy (BLE) specification.

The secondary RF link interface 306 may comprise a radio transmitter and receiver that operate at frequencies different from or using modulation different from the other interfaces. For example, the WLAN interface 302 may utilize frequencies in the 2.4 GHz and 5 GHz Industrial Scientific and Medicine (ISM) bands, while the PAN interface 304 may utilize the 2.4 GHz ISM bands. The secondary RF link interface 306 may comprise a radio transmitter that operates in the 900 MHz ISM band, within a licensed band at another frequency, and so forth. The secondary RF link interface 306 may be utilized to provide backup communication between the interactive device 104 and other devices 156 in the event that communication fails using one or more of the WLAN interface 302 or the PAN interface 304. For example, in the event the interactive device 104 travels to an area within the physical space that does not have Wi-Fi coverage, the interactive device 104 may use the secondary RF link interface 306 to communicate with another device such as a specialized access point, docking station 164, or other interactive device 104.

The other 308 network interfaces may include other equipment to send or receive data using other wavelengths or phenomena. For example, the other 308 network interface may include an ultrasonic transceiver used to send data as ultrasonic sounds, a visible light system that communicates by modulating a visible light source such as a light-emitting diode, and so forth. In another example, the other 308 network interface may comprise a wireless wide area network (WWAN) interface or a wireless cellular data network interface. Continuing the example, the other 308 network interface may be compliant with at least a portion of the 3G, 4G, LTE, or other standards.

The interactive device 104 may include one or more of the following sensors 124. The sensors 124 depicted here are provided by way of illustration and not necessarily as a limitation. It is understood that other sensors 124 may be included or utilized by the interactive device 104, while some sensors 124 may be omitted in some configurations.

A motor encoder 310 provides information indicative of the rotation or linear extension of a motor 116. The motor 116 may comprise a rotary motor, or a linear actuator. In some implementations, the motor encoder 310 may comprise a separate assembly such as a photodiode and encoder wheel that is affixed to the motor 116. In other implementations, the motor encoder 310 may comprise circuitry configured to drive the motor 116. For example, the autonomous navigation module 130 may utilize the data from the motor encoder 310 to estimate a distance traveled.

A suspension weight sensor 312 provides information indicative of the weight of the interactive device 104 on the suspension system for one or more of the wheels or the caster. For example, the suspension weight sensor 312 may comprise a switch, strain gauge, load cell, photodetector, or other sensing element that is used to determine whether weight is applied to a particular wheel, or whether weight has been removed from the wheel. In some implementations, the suspension weight sensor 312 may provide binary data such as a "1" value indicating that there is a weight applied to the wheel, while a "0" value indicates that there is no weight applied to the wheel. In other implementations, the suspension weight sensor 312 may provide an indication such as so many kilograms of force or newtons of force. The suspension weight sensor 312 may be affixed to one or more of the wheels or the caster. In some situations, the safety module 216 may use data from the suspension weight sensor 312 to determine whether or not to inhibit operation of one or more of the motors 116. For example, if the suspension weight sensor 312 indicates no weight on the suspension, the implication is that the interactive device 104 is no longer resting on its wheels, and thus operation of the motors 116 may be inhibited. In another example, if the suspension weight sensor 312 indicates weight that exceeds a threshold value, the implication is that something heavy is resting on the interactive device 104 and thus operation of the motors 116 may be inhibited.

One or more bumper switches 314 provide an indication of physical contact between a bumper or other member that is in mechanical contact with the bumper switch 314. The safety module 216 utilizes sensor data 126 obtained by the bumper switches 314 to modify the operation of the interactive device 104. For example, if the bumper switch 314 associated with a front of the interactive device 104 is triggered, the safety module 216 may drive the interactive device 104 backwards.

A floor optical motion sensor (FOMS) 316 provides information indicative of motion of the interactive device 104 relative to the floor or other surface underneath the interactive device 104. In one implementation, the FOMS 316 may comprise a light source such as a light-emitting diode (LED), an array of photodiodes, and so forth. In some implementations, the FOMS 316 may utilize an optoelectronic sensor, such as a low-resolution two-dimensional array of photodiodes. Several techniques may be used to determine changes in the data obtained by the photodiodes and translate this into data indicative of a direction of movement, velocity, acceleration, and so forth. In some implementations, the FOMS 316 may provide other information, such as data indicative of a pattern present on the floor, composition of the floor, color of the floor, and so forth. For example, the FOMS 316 may utilize an optoelectronic sensor that may detect different colors or shades of gray, and this data may be used to generate floor characterization data. The floor characterization data may be used for navigation.

An ultrasonic sensor 318 utilizes sounds in excess of 20 kHz to determine a distance from the sensor 124 to an object. The ultrasonic sensor 318 may comprise an emitter such as a piezoelectric transducer and a detector such as an ultrasonic microphone. The emitter may generate specifically timed pulses of ultrasonic sound while the detector listens for an echo of that sound being reflected from an object within the field of view. The ultrasonic sensor 318 may provide information indicative of presence of an object, distance to the object, and so forth. Two or more ultrasonic sensors 318 may be utilized in conjunction with one another to determine a location within a two-dimensional plane of the object.

In some implementations, the ultrasonic sensor 318 or a portion thereof may be used to provide other functionality. For example, the emitter of the ultrasonic sensor 318 may be used to transmit data and the detector may be used to receive data transmitted that is ultrasonic sound. In another example, the emitter of an ultrasonic sensor 318 may be set to a particular frequency and used to generate a particular waveform such as a sawtooth pattern to provide a signal that is audible to an animal, such as a dog or a cat.

An optical sensor 320 may provide sensor data 126 indicative of one or more of a presence or absence of an object, a distance to the object, or characteristics of the object. The optical sensor 320 may use time-of-flight (ToF), structured light, interferometry, or other techniques to generate the distance data. For example, ToF determines a propagation time (or "round-trip" time) of a pulse of emitted light from an optical emitter or illuminator that is reflected or otherwise returned to an optical detector. By dividing the propagation time in half and multiplying the result by the speed of light in air, the distance to an object may be determined. The optical sensor 320 may utilize one or more sensing elements. For example, the optical sensor 320 may comprise a 4×4 array of light sensing elements. Each individual light sensing element may be associated with a field of view (FOV) that is directed in a different way. For example, the optical sensor 320 may have four light sensing elements, each associated with a different 10° FOV, allowing the sensor to have an overall FOV of 40°.

In another implementation, a structured light pattern may be provided by the optical emitter. A portion of the structured light pattern may then be detected on the object using a sensor 124 such as an image sensor or camera 344. Based on an apparent distance between the features of the structured light pattern, the distance to the object may be calculated. Other techniques may also be used to determine distance to the object. In another example, the color of the reflected light may be used to characterize the object, such as whether the object is skin, clothing, flooring, upholstery, and so forth. In some implementations, the optical sensor 320 may operate as a depth camera, providing a two-dimensional image of a scene, as well as data that indicates a distance to each pixel.

Data from the optical sensors 320 may be utilized for collision avoidance. For example, the safety module 216 and the autonomous navigation module 130 may utilize the sensor data 126 indicative of the distance to an object in order to prevent a collision with that object.

Multiple optical sensors 320 may be operated such that their FOV overlap at least partially. To minimize or eliminate interference, the optical sensors 320 may selectively control one or more of the timing, modulation, or frequency of the light emitted. For example, a first optical sensor 320 may emit light modulated at 30 kHz while a second optical sensor 320 emits light modulated at 33 kHz.

A lidar 322 sensor provides information indicative of a distance to an object or portion thereof by utilizing laser light. The laser is scanned across a scene at various points, emitting pulses which may be reflected by objects within the scene. Based on the time-of-flight distance to that particular point, sensor data 126 may be generated that is indicative of the presence of objects and the relative positions, shapes, and so forth that are visible to the lidar 322. Data from the lidar 322 may be used by various modules. For example, the autonomous navigation module 130 may utilize point cloud data generated by the lidar 322 for localization of the interactive device 104 within the physical space.

The interactive device 104 may include a mast. A mast position sensor 324 provides information indicative of a position of the mast of the interactive device 104. For example, the mast position sensor 324 may comprise limit switches associated with the mast extension mechanism that indicate whether the mast is at an extended or retracted position. In other implementations, the mast position sensor 324 may comprise an optical code on at least a portion of the mast that is then interrogated by an optical emitter and a photodetector to determine the distance to which the mast is extended. In another implementation, the mast position sensor 324 may comprise an encoder wheel that is attached to a mast motor that is used to raise or lower the mast. The mast position sensor 324 may provide data to the safety module 216. For example, if the interactive device 104 is preparing to move, data from the mast position sensor 324 may be checked to determine if the mast is retracted, and if not, the mast may be retracted prior to beginning movement.

A mast strain sensor 326 provides information indicative of a strain on the mast with respect to the remainder of the interactive device 104. For example, the mast strain sensor 326 may comprise a strain gauge or load cell that measures a side-load applied to the mast or a weight on the mast or downward pressure on the mast. The safety module 216 may utilize sensor data 126 obtained by the mast strain sensor 326. For example, if the strain applied to the mast exceeds a threshold amount, the safety module 216 may direct an audible and visible alarm to be presented by the interactive device 104.

The interactive device 104 may include a modular payload bay. A payload weight sensor 328 provides information indicative of the weight associated with the modular payload bay. The payload weight sensor 328 may comprise one or more sensing mechanisms to determine the weight of a load. These sensing mechanisms may include piezoresistive devices, piezoelectric devices, capacitive devices, electromagnetic devices, optical devices, potentiometric devices, microelectromechanical devices, and so forth. The sensing mechanisms may operate as transducers that generate one or more signals based on an applied force, such as that of the load due to gravity. For example, the payload weight sensor 328 may comprise a load cell having a strain gauge and a structural member that deforms slightly when weight is applied. By measuring a change in the electrical characteristic of the strain gauge, such as capacitance or resistance, the weight may be determined. In another example, the payload weight sensor 328 may comprise a force sensing resistor (FSR). The FSR may comprise a resilient material that changes one or more electrical characteristics when compressed. For example, the electrical resistance of a particular portion of the FSR may decrease as the particular portion is compressed. In some implementations, the safety module 216 may utilize the payload weight sensor 328 to determine if the modular payload bay has been overloaded. If so, an alert or notification may be issued.

One or more temperature sensors 330 may be utilized by the interactive device 104. The temperature sensors 330 provide temperature data of one or more components within the interactive device 104. For example, a temperature sensor 330 may indicate a temperature of one or more the batteries 114, one or more motors 116, and so forth. In the event the temperature exceeds a threshold value, the component associated with that temperature sensor 330 may be shut down.

One or more interlock sensors 332 may provide data to the safety module 216 or other circuitry that prevents the interactive device 104 from operating in an unsafe condition. For example, the interlock sensors 332 may comprise switches that indicate whether an access panel is open. The interlock sensors 332 may be configured to inhibit operation of the interactive device 104 until the interlock switch indicates a safe condition is present.

A gyroscope 334 may provide information indicative of rotation of an object affixed thereto. For example, a gyroscope 334 may generate sensor data 126 that is indicative of a change in orientation of the interactive device 104 or a portion thereof.

An accelerometer 336 provides information indicative of a direction and magnitude of an imposed acceleration. Data such as rate of change, determination of changes in direction, speed, and so forth may be determined using the accelerometer 336. The accelerometer 336 may comprise mechanical, optical, micro-electromechanical, or other devices. For example, the gyroscope 334 in the accelerometer 336 may comprise a prepackaged solid-state inertial measurement unit (IMU) that provides multiple axis gyroscopes 334 and accelerometers 336.

A magnetometer 338 may be used to determine an orientation by measuring ambient magnetic fields, such as the terrestrial magnetic field. For example, the magnetometer 338 may comprise a Hall effect transistor that provides output compass data indicative of a magnetic heading.

The interactive device 104 may include one or more location sensors 340. The location sensors 340 may comprise an optical, radio, or other navigational system such as a global positioning system (GPS) receiver. For indoor operation, the location sensors 340 may comprise indoor position systems, such as using Wi-Fi Positioning Systems (WPS). The location sensors 340 may provide information indicative of a relative location, such as "living room" or an absolute location such as particular coordinates indicative of latitude and longitude, or displacement with respect to a predefined origin.

A photodetector 342 provides sensor data 126 indicative of impinging light. For example, the photodetector 342 may provide data indicative of a color, intensity, duration, and so forth.

A camera 344 generates sensor data 126 indicative of one or more images. The camera 344 may be configured to detect light in one or more wavelengths including, but not limited to, terahertz, infrared, visible, ultraviolet, and so forth. For example, an infrared camera 344 may be sensitive to wavelengths between approximately 700 nanometers and 1 millimeter. The camera 344 may comprise charge coupled devices (CCD), complementary metal oxide semiconductor (CMOS) devices, microbolometers, and so forth. The interactive device 104 may use image data acquired by the camera 344 for object recognition, navigation, collision avoidance, user communication, and so forth. For example, a pair of cameras 344 sensitive to infrared light may be mounted on the front of the interactive device 104 to provide binocular stereo vision, with the sensor data 126 comprising images being sent to the autonomous navigation module 130. In another example, the camera 344 may comprise a 10 megapixel or greater camera that is used for videoconferencing or for acquiring pictures for the user 102.

The camera 344 may include a global shutter or a rolling shutter. The shutter may be mechanical or electronic. A mechanical shutter uses a physical device such as a shutter vane or liquid crystal to prevent light from reaching a light sensor. In comparison, an electronic shutter comprises a specific technique of how the light sensor is read out, such as progressive rows, interlaced rows, and so forth. With a rolling shutter, not all pixels are exposed at the same time. For example, with an electronic rolling shutter, rows of the light sensor may be read progressively, such that the first row on the sensor was taken at a first time while the last row was taken at a later time. As a result, a rolling shutter may produce various image artifacts, especially with regard to images in which objects are moving. In contrast, with a global shutter the light sensor is exposed all at a single time, and subsequently read out. In some implementations, the camera(s) 344, particularly those associated with navigation or autonomous operation, may utilize a global shutter. In other implementations, the camera(s) 344 providing images for use by the autonomous navigation module 130 may be acquired using a rolling shutter and subsequently may be processed to mitigate image artifacts.

One or more microphones 346 may be configured to acquire information indicative of sound present in the physical space. In some implementations, arrays of microphones 346 may be used. These arrays may implement beamforming techniques to provide for directionality of gain. The interactive device 104 may use the one or more microphones 346 to acquire information from acoustic tags, accept voice input from users 102, determine a direction of an utterance, determine ambient noise levels, for voice communication with another user 102 or system, and so forth.

An air pressure sensor 348 may provide information indicative of an ambient atmospheric pressure or changes in ambient atmospheric pressure. For example, the air pressure sensor 348 may provide information indicative of changes in air pressure due to opening and closing of doors, weather events, and so forth.

An air quality sensor 350 may provide information indicative of one or more attributes of the ambient atmosphere. For example, the air quality sensor 350 may include one or more chemical sensing elements to detect the presence of carbon monoxide, carbon dioxide, ozone, and so forth. In another example, the air quality sensor 350 may comprise one or more elements to detect particulate matter in the air, such as the photoelectric detector, ionization chamber, and so forth. In another example, the air quality sensor 350 may include a hygrometer that provides information indicative of relative humidity.

An ambient light sensor 352 may comprise one or more photodetectors 342 or other light-sensitive elements that are used to determine one or more of the color, intensity, or duration of ambient lighting around the interactive device 104.

An ambient temperature sensor 354 provides information indicative of the temperature of the ambient physical space proximate to the interactive device 104. In some implementations, an infrared temperature sensor may be utilized to determine the temperature of another object at a distance.

A floor analysis sensor 356 may include one or more components that are used to generate at least a portion of floor characterization data. In one implementation, the floor analysis sensor 356 may comprise circuitry that may be used to determine one or more of the electrical resistance, electrical inductance, or electrical capacitance of the floor. For example, two or more of the wheels in contact with the floor may include an allegedly conductive pathway between the circuitry and the floor. By using two or more of these wheels, the circuitry may measure one or more of the electrical properties of the floor. Information obtained by the floor analysis sensor 356 may be used by one or more of the safety module 216, the autonomous navigation module 130, the task module 132, and so forth. For example, if the floor analysis sensor 356 determines that the floor is wet, the safety module 216 may decrease the speed of the interactive device 104 and generate a notification alerting the user 102.

The floor analysis sensor 356 may include other components as well. For example, a coefficient of friction sensor may comprise a probe that comes into contact with the surface and determines the coefficient of friction between the probe and the floor.

A caster rotation sensor 358 provides data indicative of one or more of a direction of orientation, angular velocity, linear speed of the caster, and so forth. For example, the caster rotation sensor 358 may comprise an optical encoder and corresponding target that is able to determine that the caster transitioned from an angle of 0° at a first time to 49° at a second time.

The sensors 124 may include a radar 360. The radar 360 may be used to provide information as to a distance, lateral position, and so forth, to an object.

The sensors 124 may include a passive infrared (PIR) sensor 362. The PIR sensor 362 may be used to detect the presence of users 102, pets, hotspots, and so forth. For example, the PIR sensor 362 may be configured to detect infrared radiation with wavelengths between 8 and 14 micrometers.

The interactive device 104 may include other sensors 364 as well. For example, a capacitive proximity sensor may be used to provide proximity data to adjacent objects. Other sensors 364 may include radio frequency identification (RFID) readers, near field communication (NFC) systems, coded aperture cameras, electrical current sensors, voltage sensors, and so forth. For example, NFC tags may be placed at various points within the physical space to provide landmarks for the autonomous navigation module 130. One or more touch sensors may be utilized to determine contact with a user 102 or other objects.

The interactive device 104 may include one or more output devices 160. A motor 116 may be used to provide linear or rotary motion. A light 382 may be used to emit photons. A speaker 384 may be used to emit sound. A display 386 may comprise one or more of a liquid crystal display, light emitting diode display, electrophoretic display, cholesteric liquid crystal display, interferometric display, and so forth. The display 386 may be used to present visible information such as graphics, pictures, text, and so forth. In some implementations, the display 386 may comprise a touchscreen that combines a touch sensor and a display 386.

In some implementations, the interactive device 104 may be equipped with a projector 388. The projector 388 may be able to project an image on a surface, such as the floor, wall, ceiling, and so forth.

A scent dispenser 390 may be used to emit one or more smells. For example, the scent dispenser 390 may comprise a plurality of different scented liquids that may be evaporated or vaporized in a controlled fashion to release predetermined amounts of each.

One or more moveable component actuators 392 may comprise an electrically operated mechanism such as one or more of a motor, solenoid, piezoelectric material, electroactive polymer, shape-memory alloy, and so forth. The actuator controller may be used to provide a signal or other input that operates one or more of the moveable component actuators 392 to produce movement of the moveable component.

In other implementations, other 394 output devices may be utilized. For example, the interactive device 104 may include a haptic output device that provides output that produces particular touch sensations to the user 102. Continuing the example, a motor 116 with an eccentric weight may be used to create a buzz or vibration to allow the interactive device 104 to simulate the purr of a cat.

In some implementations, a sensor 124 may include a computing device or elements thereof. For example, a camera 344 may include an image sensor, a processor, memory, and so forth. Continuing the example, the computing device of the camera 344 may process the output of the image sensor.

FIG. 4 illustrates at 400 a trigger library 140 and a function library 146 used to simulate emotion, according to some implementations. While the data is described in tabular form, other data structures may be used.

The trigger library 140 associates a particular trigger as indicated by the occurrence data 136 with one or more effect values 142. For example, triggers may include one or more of a hardware failure, a software failure, successful completion of a task, unsuccessful completion of the task, user input 108, battery charge below a threshold amount, time since last interaction with a user 102, time since conclusion of the last task, and so forth.

The trigger library 140 may comprise a trigger identifier (ID) 402, a trigger description 404, and one or more effect values 142. The trigger ID 402 may be used to designate a particular trigger description 404 and associated effect value(s) 142. The trigger description 404 describes the conditions, such as those indicated by occurrence data 136, that are associated with a particular trigger being satisfied or deemed active. Each trigger ID 402 may be associated with one or more effect values 142. For example, if a single emotional dimension is used, a single effect value 142 is associated with a particular trigger ID 402. In another example as shown here in which two emotional dimensions are in use, each trigger ID 402 is associated with two effect values 142, one for each emotional dimension. While two effect values 142 are shown for two emotional dimensions, any number of effect values 142 and emotional dimensions may be used.

In some implementations the effect values 142 may be determined based at least in part on sensor data 126. The sensor data 126 may be processed to determine some input, which is then used to determine the effect value 142 associated with the trigger. For example, the optical sensor 320 may provide sensor data 126 indicative of a distance to an object. Continuing the example, the effect value 142 for a particular trigger ID 402 may be based on the distance multiplied by a specified value.

The function library 146 comprises one or more functions 406 and one or more associated trigger IDs 408. A function 406 is configured to accept as input an effect value, such as the function input value 144, and provide as output one or more emotion value(s) 148. A function may comprise executable code, circuitry, or a combination thereof.

In some implementations particular functions 406 may be associated with associated trigger IDs 408. For example, a sigmoid function such as a logistic function with a first set of parameters may be associated with associated trigger IDs 408 of 1 through 7.

A function 406 in the function library 146 may have different parameters, such as constants, which may be changed. For example, the parameters of the logistic function may be varied to change the "personality" of the interactive device 104.

The function 406 may be designed to constrain output to between a lower limit and an upper limit. The function 406 may be configured such that there is a non-linear relationship of input to output across the entire range of outputs from the function 406. For example, the function 406 may comprise a sigmoid function, a plurality of individual linear functions that form a continuous function, a step function, and so forth. In one implementation, the function 406 may comprise a polynomial function of degree two or more. Because of the overall non-linearity, depending upon the function 406 the absolute value of the difference in which the emotion value 148 changes responsive to a change in the function input value 144 from one time to another may vary.

In some implementations the function 406 may be determined based on a machine learning system. A machine learning system such as a neural network may be trained using training data. The training data may comprise a set of data that describe tuples of a trigger ID 402 and function input value 144, and the expected emotion value 148 to be provided as output.

FIG. 5 illustrates at 500 an emotional category library 150 and a behavior library 156, according to some implementations.

The emotional category library 150 associates particular emotion values 148 such as those designated as within a specified emotion value range 502 with particular emotional category values 152. For example, an emotion value range 502 of −0.45 to −0.2 may be associated with an emotional category value of "confused".

The behavior library 156 associates particular emotion values 148 or emotional category values 152 with one or more behavior outputs 158. For example, an emotional category value 152 of "happy" may be associated with behavior output 158 of "display smiley face animation on display device of interactive device 104, tilt display device of interactive device 104 to +20 degrees, allow movement at up to 100% the maximum permitted speed". Behavior outputs 158 may include, but are not limited to, constraints on operation of one or more actuators, modifications to synthesized speech, modifications to graphic user interface, modification of operation of one or more components of the interactive device 104 or other devices 168, and so forth. For example, a behavior output 158 may be to change the brightness and color of a display backlight or indicator light.

FIG. 6 illustrates a system 600 to simulate an emotional state, according to some implementations. Inputs such as sensor data 126, input data 128, and so forth are provided to the trigger module 134. The trigger module 134 determines the occurrence data 136 that is indicative of an occurrence of a trigger. For example, the trigger module 134 may compare these inputs to thresholds, process with one or more machine learning techniques, and so forth. In some implementations, the trigger module 134 may determine occurrence data 136 that is indicative of an occurrence of a trigger that reports inactivity. For example, if no interaction with a user 102 is determined within a threshold duration of time such as 10 minutes, occurrence data 136 indicative of "no user interaction" may be determined.

The occurrence data 136 is provided to the emotion module 138. The emotion module 138 may include an effect module 602. The effect module 602 may accept as input the occurrence data 136 and use the trigger library 140 to determine one or more effect values 142 associated with the occurrence data 136. For example, the effect module 602 may perform a lookup operation from the trigger library 140 using the occurrence data 136 as an input.

In some implementations the trigger module 134 may use information such as timestamp data in the occurrence data 136 that is indicative of when a trigger has occurred to determine the sequence of triggers. Some triggers may be delayed in their determination. For example, sensor data 126 from a camera 344 may be acquired at time t=0, and then take until time t=4 to process and determine the occurrence of a first trigger. Continuing the example, the sensor data 126 from a bumper switch 314 may be acquired at time t=1 and then take until time t=2 to be processed and determine occurrence of a second trigger. The trigger module 134 may determine the timestamps associated with occurrences, such as a timestamp in the sensor data 126 that is indicative of when the sensor data 126 was acquired, and use this timestamp to sequence the occurrence data 136. Continuing the example, the occurrence data 136 would indicate that the first trigger occurred first, and the second trigger occurred next.

The effect values 142 may be provided to an accumulation module 604. The accumulation module 604 determines the function input value 144. In one implementation, the function input value 144 may be determined based on the effect values 142 and the historical data 234. For example, the accumulation module 604 may add (sum) the effect value(s) 142 to a previous function input value 606 stored in the historical data 234 to determine the function input value 144. In other implementations, one or more other operations including, but not limited to: a weighted sum, multiplication, exponentiation, scaling, and so forth may be used to combine the effect value(s) 142 and historical data 234 such as a previous function input value 606. If historical data 234, such as a previous function input value 606, is not available, a default value may be used.

The historical data 234 may comprise the previous function input value 606, previous emotion value 608, or other information.

In some implementations if a plurality of emotional dimensions are in use, a plurality of function input values 144 may be used. For example, a first function input value 144 for a first dimension may be calculated, a second function input value 144 for a second dimension, and so forth.

In some implementations a trigger may be designated to be associated with no accumulation. For example, a particular trigger ID 402 may be passed through the accumulation module 604, with the function input value 144 being based on the effect value(s) 142, and not taking into consideration any historical data 234.

A function module 610 accepts as input the function input value(s) 144 and provides one or more emotion values 148 as output. The emotion values 148 may be expressed as vectors in implementations involving two or more emotional dimensions. In some implementations, the function module 610 may provide as output a confidence value associated with the emotion values 148. The confidence value may be indicative of a likelihood that the emotion value 148 is correct. The confidence value may decrease if the inputs to the emotion module 138 are noisy or uncertain. For example, if the occurrence data 136 exhibits a low confidence value, the resulting emotion value 148 may be low in confidence as well.

The function input value(s) 144 are provided as input to a function 406 from the function library 146. For example, if a plurality of emotional dimensions are in use, the function input values(s) 144 for the respective dimensions may be provided as inputs to one or more functions 406. In some implementations, the functions 406 used for different emotional dimensions may differ. For example, a first function 406(1) may be used for a first emotional dimension while a second function 406(2) is used for a second emotional dimension.

The function 406 may be determined for use based on sensor data 126, input data 128, output from the clock(s) 202, and so forth. For example, the user 102 may provide user input 108 that results in changes to one or more parameters of a function 406, selects a particular function 406, and so forth. In other implementations the function module 610 may accept as input other information such as elapsed time as indicated by clock data from the clock 202.

For example, the function 406 may have a decay or other time-based element that, in the absence of triggers, would change the emotion value 148. Continuing the example, if no triggers occur, the emotion value 148 may eventually revert to a neutral value such as 0.

The function module 610 may provide the emotion value(s) 148 to one or more of a categorization module 612 or the behavior module 154. As mentioned above, in some implementations a confidence value associated with the emotion value(s) 148 may also be provided.

The categorization module 612 uses the emotional category library 150 to associate particular emotion values 148, or ranges of emotion values 148, with particular emotional category values 152. For example, the categorization module 612 may compare the emotion value 148 with one or more emotion value ranges 502 to determine the range into which the emotion value 148 falls. The emotional category value 152 corresponding to the range is then provided as output. In some implementations, the emotion values 148 for multiple emotional dimensions may be used to determine a single emotional category value 152. In other implementations, if multiple emotional dimensions are in use, multiple emotional category values 152 may be provided, one for each emotional dimension.

The emotional category value 152 is provided to one or more behavior modules 154. The behavior module 154 may use the behavior library 156 to associate emotional category value(s) 152 with behavior output 158. In other implementations, the emotion value(s) 148 may be used to determine the behavior output 158. The determined behavior output 158 may then be used to operate or influence the operation of the interactive device 104. For example, the behavior output 158 may be used to operate one or more output devices 160.

The behavior module 154 may use confidence values associated with the emotion values 148 to determine the behavior output 158. For example, the behavior output 158 may be presented if the confidence value is greater than a threshold value.

A plurality of behavior modules 154 may be used in some implementations. For example, a behavior module 154 may be associated with a particular set of one or more output devices 160. Other input may also be provided to the one or more behavior modules 154.

An initialization module 614 may be used to set one or more initialization values 616 of the emotion module 138 or other modules in the system 100. For example, the initialization module 614 may set a default previous function input value 606 when no historical data 234 is available. In another implementation, the initialization module 614 may set a default emotion value 148. By setting specific initialization values 616, an initial "personality" having a particular simulated emotion may be provided.

In some implementations, a common simulated emotion may be associated with a plurality of interactive devices 104. For example, the user 102 may use many interactive devices 104 in their environment. Responsive to triggers associated with those many interactive devices 104, an emotion value 148 may be determined and used in the operation of those many interactive devices 104. Continuing the example, a collection of interactive devices 104 may operate in concert with one another and exhibit a common emotion value 148 and resulting behavior output 158 consistent with that emotion value 148.

In another implementation, a common simulated emotion may be associated with a plurality of interactive devices 104 and a particular user 102. For example, a first user 102(1) may interact with the many interactive devices 104 in the environment, resulting in a first emotion value 148(1) associated with that first user 102(1). That first emotion value 148(1) may be used to operate the interactive devices 104 during interactions with the first user 102(1). Continuing the example, a second user 102(2) who interacts with the same many interactive devices 104 in the environment may be associated with a second emotion value 148(2). That second emotion value 148(2) may be used to operate the interactive devices 104 during their interaction with the second user 102(2). For example, the interactive devices 104 may exhibit behavior outputs 158 consistent with a "happy" emotional category value 152 for the first user 102(1) while also providing behavior outputs 158 consistent with a "confused" emotional category value 152 for the second user 102(2) using those same interactive devices 104.

The overall system as described in FIG. 6 is modular in nature, allowing for changes to be easily made to various portions without requiring time consuming and computationally expensive retraining. In some implementations, entries may be added, removed, or updated in the various libraries and only effect the module immediately downstream, simplifying changes to the system. The computational and memory requirements for this system are minimal, allowing emotions to be simulated with very low impact on the interactive device 104, and facilitating emotion simulation on devices which would otherwise be considered too limited to provide such functionality.

Using the techniques described in this disclosure, the resulting emotion value(s) 148 and their changes over time responsive to various triggers results in a simulated emotional state of the interactive device 104 that is perceived by the user 102 as being naturalistic, in accord with the user's 102 expectations of an interaction with a person or pet. The individual modules acting in concert produce an emergent behavior that simulates an emotional response in the interactive device 104.

FIG. 7 illustrates at 700 graphs of functions 406 used to determine an emotion value 148 of the interactive device 104, according to some implementations. For ease of illustration and not necessarily as a limitation, a single emotional dimension is assumed for FIGS. 7 and 8.

A first graph 702 depicts along a horizontal axis the function input value 144 ranging from −100 to +100 and a vertical axis of emotion value 148 ranging from −1 to +1. This illustration shows a curve of function 406(1) available in the function library 146. As described above, by varying the functions 406 used or parameters of these functions 406, different simulated emotional responses may be realized.

A second graph 706 also depicts along a horizontal axis the function input value 144 ranging from −100 to +100 and a vertical axis of emotion value 148 ranging from −1 to +1. In this illustration, a different function 406(2) is depicted in which changes in emotion value 148 are constrained. For example, the function 406(2) may be a hysteresis function.

Figure 8:
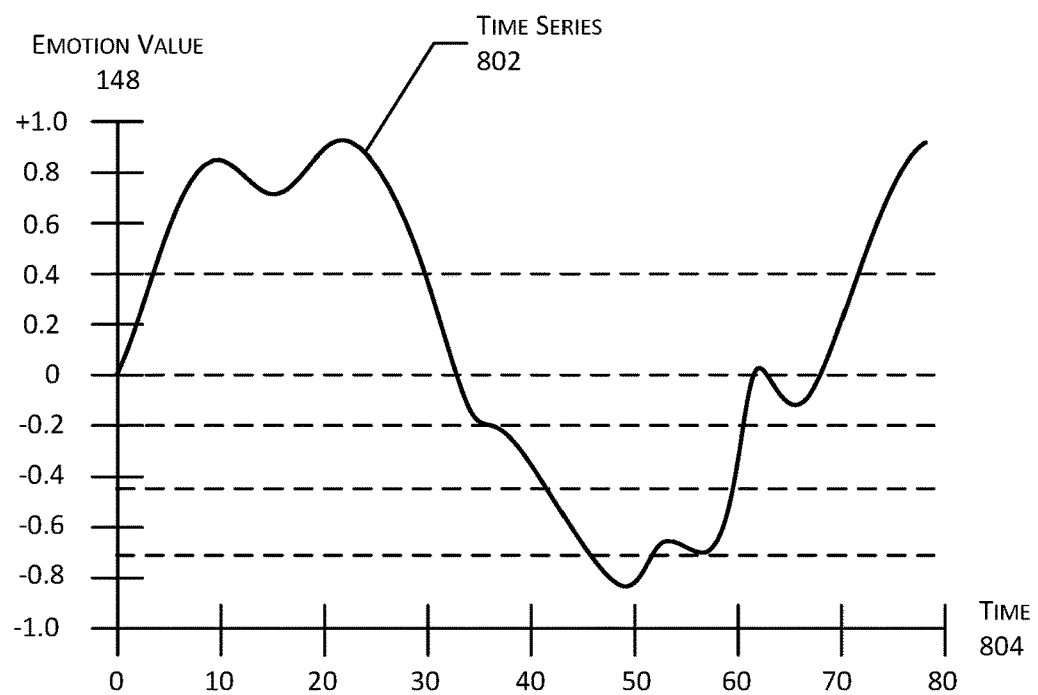
FIG. 8 illustrates a time series of the emotion value of the interactive device, according to some implementations.

FIG. 8 illustrates a graph 800 of a time series 802 of historical data 234, such as the emotion value 148 of the interactive device 104 at different times, according to some implementations. The graph 800 includes a horizontal axis of time 804 ranging from 0 to 80 and a vertical axis of emotion value 148 ranging from −1 to +1. In this illustration changes of the emotion value 148 of the interactive device 104 over time are shown.

Information based on this time series 802 may be determined. For example, higher order data such as a first derivative of the time series 802 may be used to determine a direction of emotional change indicating whether a change in emotion values 148 at a given time is changing positively or negatively. Other higher order data may also be determined from the historical data 234. In yet another example, a second derivative of the time series 802 may be used to determine an emotional acceleration that is indicative of a rate of change in the emotion values 148 associated with a time. In yet another example, the third derivative may express a "jerk" that is representative of a rate of change of emotion acceleration.

In some implementations the higher order data may be used as one or more inputs to the function module 610. A value of one or more of the higher order functions may be determined for a specified time. For example, the value of a third derivative or "jerk" of the time series 802 of emotion value 148 at the point in time corresponding to a previous emotion value 148 may be used as a factor to determine the emotion value 148. Continuing the example, the effect value 142 may be multiplied by the "jerk" value to determine the function input value 144.

The information from the time series 802 may be used to determine the behavior of the interactive device 104. For example, emotional acceleration that exceeds a threshold value may result in the interactive device 104 providing a particular behavior output 158.

Figure 9:
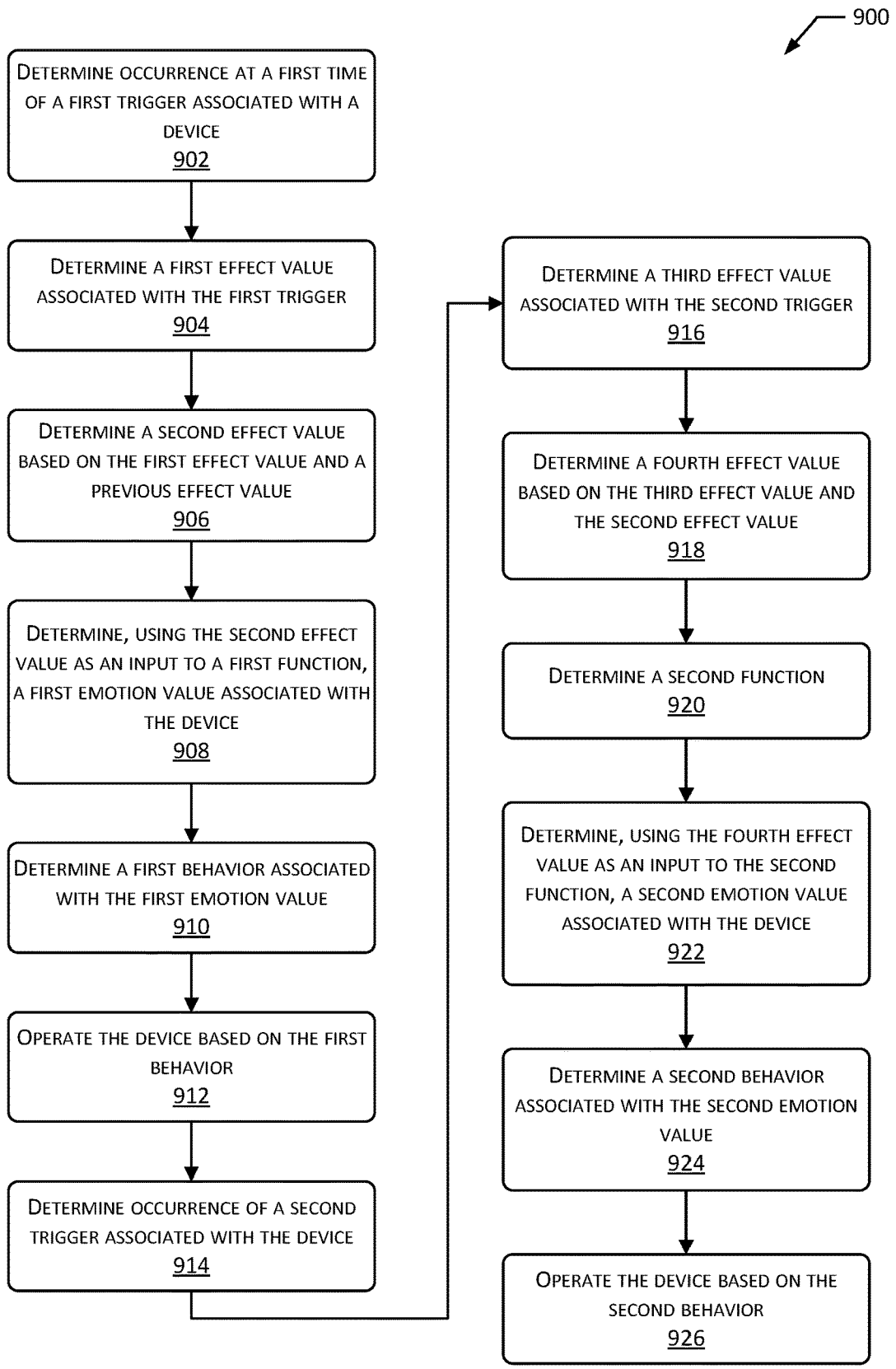
FIG. 9 is a flow diagram of a process for determining an emotion value of an interactive device, according to some implementations.

FIG. 9 is a flow diagram 900 of a process for determining an emotion value 148 of an interactive device 104, according to some implementations. The process may be implemented at least in part by the interactive device 104, the server 166, and so forth.

At 902 occurrence of a first trigger associated with a device is determined at a first time. For example, the trigger module 134 may use the sensor data 126 of the interactive device 104 to determine that the user 102 has uttered a wakeword and provide occurrence data 136 indicative of the occurrence of this trigger.

At 904 a first effect value 142 associated with the first trigger is determined. For example, the effect module 602 may use the occurrence data 136 to determine the first effect value 142.

At 906 a second effect value 142 is determined based on the first effect value 142 and historical data 234, such as a previous effect value 142. For example, the accumulation module 604 may add the effect value 142 from the effect module 602 to the previous function input value 606. In one implementation, the previous function input value 606 may comprise a cumulative effect value. The cumulative effect value may be calculated as a running total of an initialization value and subsequent effect values 142 since last initialized.

At 908 a first emotion value 148 associated with the interactive device 104 is determined, using the second effect value 142 as an input to a first function 406. For example, the function module 610 uses the function input value 144 to determine the first emotion value 148.

At 910 a first behavior associated with the first emotion value 148 is determined. For example, the categorization module 612 may use the first emotion value 148 as input to determine the emotional category value 152. The emotional category value 152 may then be used by the behavior module 154 to determine an associated first behavior output 158.

At 912 the device is operated based on the first behavior. For example, the first behavior output 158 may be used to influence operation of the interactive device 104.

At 914 occurrence of a second trigger associated with the device is determined. This occurrence may be at the first time, or a second time. For example, the trigger module 134 may use the sensor data 126 of the interactive device 104 to determine that the available battery charge left in the battery 114 is less than a threshold amount.

At 916 a third effect value 142 associated with the second trigger is determined. For example, the effect module 602 may use the occurrence data 136 to determine the third effect value 142.

At 918 a fourth effect value 142 is determined based on the third effect value 142 and the second effect value 142. For example, the accumulation module 604 may add the effect value 142 from the effect module 602 to the previous function input value 606.

At 920 a second function 406 is determined. In one implementation, the function module 610 may use the trigger ID 402 to determine the function 406 corresponding to the matching associated trigger ID 408 in the function library 146.

At 922 a second emotion value 148 associated with the interactive device 104 is determined using the fourth effect value 142 as an input to the second function 406. For example, the function module 610 uses the function input value 144 to determine the second emotion value 148.

At 924 a second behavior associated with the second emotion value 148 is determined. For example, the categorization module 612 may use the second emotion value 148 as input to determine the emotional category value 152. The emotional category value 152 may then be used by the behavior module 154 to determine an associated second behavior output 158.

At 926 the device is operated based on the second behavior. For example, the second behavior output 158 may be used to influence operation of the interactive device 104.

The processes and methods discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, physical spaces, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A robot comprising:
   one or more sensors;
   one or more output devices;
   one or more motors coupled to one or more wheels;
   one or more memories storing first computer-executable instructions; and
   one or more processors to execute the first computer-executable instructions to:
      determine a previous function input value associated with a simulated emotion of the robot;
      receive a command to perform a task;
      complete the task successfully;
      determine an effect value associated with successful completion of the task;
      determine a function input value based on the previous function input value and the effect value;
      determine, using the function input value as an input to a sigmoid function, an emotion value that is indicative of the simulated emotion of the robot as a result of successful completion of the task;
      determine behavior output that is associated with the emotion value; and
      present, based on the behavior output, output using the one or more output devices.

2. A method performed in part by a device, the method comprising:
   determining occurrence at a first time of a first trigger associated with the device;
   determining a first effect value associated with the first trigger;
   determining a second effect value based on the first effect value and historical data; and
   determining, using the second effect value as an input to a first function, a first emotion value associated with the device.

3. The method of claim 2, further comprising:
   determining a behavior associated with the first emotion value; and
   operating the device based at least in part on the behavior.

4. The method of claim 2, further comprising:
   wherein the historical data comprises a first time series of previously determined emotion values; and
   determining, using the first time series, one or more of:
      a first derivative of the first time series,
      a second derivative of the first time series, or
      a third derivative of the first time series;
   determining one or more values of one or more of the first derivative, the second derivative, or the third derivative at a specified time; and
   using the one or more values as one or more inputs to the first function.

5. The method of claim 2, wherein the first function is bounded, non-linear.

6. The method of claim 2, further comprising:
   determining, at a second time, occurrence of a second trigger associated with the device;
   determining a third effect value associated with the second trigger;
   determining a fourth effect value based on the third effect value and the second effect value;
   determining a second function based on one or more of:
      the second effect value,
      the fourth effect value,
      the first emotion value,
      user input,
      sensor data, or
      clock data; and
   determining, using the fourth effect value as an input to the second function, a second emotion value associated with the device.

7. The method of claim 2, further comprising:
   determining occurrence of a second trigger associated with the device;
   determining a third effect value associated with the second trigger;
   determining a fourth effect value based on the third effect value and the second effect value;
   determining a second function based on one or more of:
      available battery charge, or
      duration since last interaction with a user; and
   determining, using the fourth effect value as an input to the second function, a second emotion value associated with the device.

8. The method of claim 2, further comprising:
   determining occurrence of a second trigger associated with the device;
   determining a third effect value associated with the second trigger;
   determining a second function based on one or more of:
      available battery charge, or
      duration since last interaction with a user; and
   determining, using the third effect value as an input to the second function, a second emotion value associated with the device.

9. The method of claim 2, further comprising:
   determining the first emotion value is within a first range;
   determining an emotional category associated with the first range; and
   operating the device based at least in part on the emotional category.

10. The method of claim 2, the first trigger comprising one or more of:
    a change in status of hardware of the device,
    a change in status of software of the device,
    successful completion of a task at least in part by the device, unsuccessful completion of the task,
user input,
interaction with a user, or
duration since a second trigger.

11. The method of claim 2, further comprising:
acquiring sensor data from a sensor associated with the device;
determining, based on the sensor data, a second input; and
wherein the first effect value is based at least in part on the second input.

12. A device comprising:
one or more memories storing first computer-executable instructions; and
one or more processors to execute the first computer-executable instructions to:
  determine occurrence at a first time of a first trigger associated with the device;
  determine a first effect value associated with the first trigger;
  determine, using the first effect value as a first input to a first function, a first emotion value associated with the device; and
  operate the device based at least in part on the first emotion value.

13. The device of claim 12, wherein the first function comprises a bounded polynomial function of degree two or more.

14. The device of claim 12, wherein the first trigger comprises one or more of:
a change in status of hardware of the device,
a change in status of software of the device,
successful completion of a task at least in part by the device,
unsuccessful completion of the task,
user input,
interaction with a user, or
duration since a previous trigger.

15. The device of claim 12, the one or more processors to execute the first computer-executable instructions to:
determine a second effect value at a second time that is before the first time; and
determine, using the second effect value as a second input to the first function, the first emotion value associated with the device.

16. The device of claim 12, the device further comprising:
one or more sensors; and
the one or more processors to execute the first computer-executable instructions to:
  acquire sensor data from the one or more sensors;
  determine, based on the sensor data, one or more inputs; and
  wherein the first function uses the one or more inputs as an input to the first function.

17. The device of claim 12, the one or more processors to execute the first computer-executable instructions to:
determine a first time series comprising the first emotion value that is associated with the first time and a plurality of emotion values associated with other times;
determine, using the first time series, one or more of:
  a first derivative of the first time series,
  a second derivative of the first time series, or
  a third derivative of the first time series; and
determine a second emotion value based at least in part on the one or more of the first derivative, the second derivative, or the third derivative.

18. The device of claim 12, the one or more processors to execute the first computer-executable instructions to:
determine occurrence of a second trigger associated with the device;
determine a second effect value associated with the second trigger;
determine a third effect value based on the first effect value and the second effect value;
determine a second function;
determine, using the third effect value as a second input to the second function, a second emotion value associated with the device; and
operate the device based at least in part on the second emotion value.

19. The device of claim 12, the one or more processors to execute the first computer-executable instructions to:
determine a behavior output that is associated with the first emotion value; and
operate the device based at least in part on the behavior output.

20. The device of claim 12, the one or more processors to execute the first computer-executable instructions to:
acquire sensor data from a sensor associated with the device;
determine, based on the sensor data, a second input; and
wherein the first effect value is based at least in part on the second input.

* * * * *